US012750229B1

(12) United States Patent
Michaelis et al.

(10) Patent No.: US 12,750,229 B1
(45) Date of Patent: Sep. 29, 2026

(54) SYSTEM, METHOD AND APPARATUS FOR RESOURCE ACCESS CONTROL AND AUTONOMOUS AGENT GOVERNANCE

(71) Applicant: Beyond Aerospace Ltd., Kelowna (CA)

(72) Inventors: Oliver Michaelis, San Diego, CA (US); Mike Ball, Kelowna (CA)

(73) Assignee: Beyond Aerospace Ltd., Kelowna (CA)

( * ) Notice: Subject to any disclaimer, the term of this patent is extended or adjusted under 35 U.S.C. 154(b) by 0 days.

(21) Appl. No.: 19/436,468

(22) Filed: Dec. 30, 2025

Related U.S. Application Data

(63) Continuation-in-part of application No. 19/422,667, filed on Dec. 17, 2025.

(60) Provisional application No. 63/906,157, filed on Oct. 27, 2025, provisional application No. 63/894,431, filed on Oct. 6, 2025.

(51) Int. Cl.
*H04L 9/32* (2006.01)
*H04L 9/00* (2022.01)

(52) U.S. Cl.
CPC .............. *H04L 9/3226* (2013.01); *H04L 9/50* (2022.05)

(58) Field of Classification Search
CPC ................................ H04L 9/3226; H04L 9/50
See application file for complete search history.

(56) References Cited

U.S. PATENT DOCUMENTS

| | | | | |
|---|---|---|---|---|
| 11,429,958 | B1 | 8/2022 | Michaelis et al. | |
| 11,463,554 | B2 * | 10/2022 | Chaysinh | H04L 47/83 |
| 11,855,987 | B1 * | 12/2023 | Chhabra | H04L 63/12 |
| 12,192,386 | B2 * | 1/2025 | Cohler | H04L 47/12 |

(Continued)

FOREIGN PATENT DOCUMENTS

| | | |
|---|---|---|
| KR | 20110104524 | 1/2011 |

OTHER PUBLICATIONS

May Thura Lwin, Jinhyuk Yim and Young-Bae Ko, Blockchain-Based Lightweight Trust Management in Mobile Ad-Hoc Networks, open access article, Jan. 27, 2020, pp. 1-19, MDPI, Basel, Switzerland.

(Continued)

*Primary Examiner* — Yonas A Bayou
(74) *Attorney, Agent, or Firm* — Thibault Patent Group

(57) ABSTRACT

System and method for providing autonomous AI agent governance, credential management, and secure inter-agent communications. A credential session is formed between two entities in a system prior to interactions between the two entities. The credential session lists a number of credential attributes common to both entities needed to in order for an interaction between the two, and attribute values of a requesting entity associated with the common credential attributes. When an interaction between the two entities is initiated, the credential attribute values listed in the credential session are evaluated against a target entity's current credential attributes. When at least one of the credential attribute values in the credential session satisfies at least one of the credential attributes of the target entity, the interaction may proceed. Credentials and credentials sessions are stored and processed on a blockchain network to ensure data integrity and non-repudiation of the policies implementing the agent governance.

18 Claims, 12 Drawing Sheets

(56) References Cited

U.S. PATENT DOCUMENTS

| | | | |
|---|---|---|---|
| 12,244,744 B2 | 3/2025 | Michaelis et al. | |
| 2020/0076601 A1* | 3/2020 | Tabrizi | H04L 9/0637 |
| 2021/0194988 A1* | 6/2021 | Chaysinh | H04L 41/5025 |
| 2025/0254135 A1* | 8/2025 | De Castro Marchese | H04L 47/822 |
| 2025/0286704 A1 | 9/2025 | Michaelis | |

OTHER PUBLICATIONS

Rafael Belchior, Benedikt Putzy, Guenther Pernuly, Miguel Correia, Andre Vasconcelos and Sergio Guerreiro, SSIBAC: Self-Sovereign Identity Based Access Control, scholarly paper, Feb. 9, 2021, pp. 1-9, IEEE, New York, United States.

Kaliya Young, Verifiable Credentials Flavors Explained, technical article, date unknown, pp. 1-21, The Linux Foundation, San Francisco, United States.

TYKN, Blockchain Identity Management: The Definitive Guide (2021 Update), Internet article, May 19, 2021, https://tykn.tech/identity-management-blockchain/.

Tyler Ruff, Verifiable Credentials 101 for SSI with Tyler Ruff—Decentralized Digital Identity, Youtube video, Sep. 18, 2018, https://www.youtube.com/watch?v=60_iJnhlh50.

Oliver Michaelis, System, Method and Apparatus for Managing Cross-Security Domain Dataaccess, co-pending U.S. Appl. No. 19/169,339, filed Apr. 3, 2025.

* cited by examiner

```
{
  "@context": [
    "https://www.w3.org/2018/credentials/v1",
    "https://ares.beyondaerospace.com/2021/credentials/aae/v1"
  ],
  "id": "http://ares-customer.com/credentials/3732",
  "type": ["VerifiableCredential", "AAECredential"],
  "issuer": "https://ares-customer.com/issuers/18",
  "issuanceDate": "2021-04-18T19:23:24Z",
  "expirationDate": "2021-04-18T19:24:24Z",
  "credentialSubject": {
    "id": "did:hyperdrive.ares- customer.com:ebfeb1f712ebc6f1c276e12ec21",
    "IAM Conditions": {
      "org": "Ford Motor Company",
    "role": ["CEO", "CFO", "CTO"]
  },
    "custom-conditions": [
    "access-constraints": [
      {
        "networks": ["secure_network_399AE338"]
      },{
        "locations": [
        "33.22, -117.45,
        "12.10, -149.22,
        "31.69, -129.20."
        ]
      },
    ],
  ],
  },
 },
  "pkNonce":
"8eGWSiTiWtEA8WnBwX4T259STpxpRKuk...kpFnikqqSP3GMW7mVxC4chxFhVs"
}
```

FIG. 4

SYSTEM, METHOD AND APPARATUS FOR RESOURCE ACCESS CONTROL AND AUTONOMOUS AGENT GOVERNANCE

CROSS-REFERENCE TO RELATED APPLICATIONS

This application claims the benefit of U.S. provisional patent application 63/906,157, filed on Oct. 27, 2025 and is a continuation-in-part of U.S. patent application Ser. No. 19/422,667, filed on Dec. 17, 2025, which claims the benefit of U.S. provisional patent application 63/894,431, filed on Oct. 6, 2025.

BACKGROUND

Field of Use

The present invention relates to the field of blockchain technology and more specifically to a system, method and apparatus for controlling access to, and providing governance for, digital resources in a networked environment, including semi- and fully autonomous AI agents and models.

Description of the Related Art

Blockchain technology has exploded into the mainstream recently, underlying the technology of cryptocurrencies. Blockchain technology utilizes encrypted, distributed, digital ledgers that describe digital transactions that occur between two or more entities over the Internet. Multiple "nodes" in a network keep a copy of the distributed ledger, and when a digital transaction occurs, each node, or a majority of nodes, in the network attempts to validate the transaction. When the transaction is validated by each of the validating nodes, it sends proof of the validation to the other nodes. Once a majority of the nodes agree that the proof is valid, the transaction is added to a plurality of other validated transactions, and a new "block" is written to the distributed ledger and updated on all of the nodes.

While blockchain technology is well-known, used as the technological backbone of digital cryptocurrencies, it may be used in other applications, such as voting, identification, data management and distribution, data storage, and many others.

One drawback of currently deployed resource access control systems is that a single entity is often charged with important transaction processing. For example, in the case of data management and distribution, a user may wish to access a file stored in a database. Access to the database may be managed by a single entity, such as a computer server or "node" that is programmed to authenticate and authorize the user for access to the database. While identification may be performed using known tokens (i.e., username/password combinations or public/private keys assigned to the user such as a FIDO keypair) managed by existing identity and access management systems (IAM service) with user and attribute databases, authorization by the computer server holding the data typically comprises an evaluation by the computer server only, i.e., the computer server may evaluate whether the user has provided a proper username and matching password or valid key and is listed as an authorized person against a list of authorized persons stored by the computer server. This single point of authorization may be compromised by another computer server intercepting communications between the user and the computer server (a "man in the middle" attack), by an malicious user with broad access rights (an "insider attack"), or by malicious software installed on the server itself to compromise its execution environment.

Another problem with traditional authorization schemes is that they frequently only authorize users at a certain broad-scoped level. In the example above, authorization is described in terms of a general authorization to access every file in the database, or a broad subset, at any time of day, using any type of device, on any local-area network. There may be instances where an administrator may want to customize access for each file in the database so that only authorized persons, given other constraints, can access particular files, and any subsequent access can be uniquely identified and memorialized. Most state of the art IAM services impose limits on the relationship between a user account and the number of resources they can be associated with due to the underlying database implementation persistently storing users and their attributes.

Yet another problem with traditional authorization schemes is that they do not establish contextual conditions under which a user may access a resource. For example, it may be desirable to only allow a user to access a resource at certain times of the day, in certain locations, when connected to only permitted local and/or wide-area networks, when the user is actually looking at a display screen of a device displaying the resource.

Thus, it would be desirable to authorize access to particular resources, such as computer files, physical entities, etc., in a distributed fashion and enable more comprehensive descriptions of the possible contexts within which such access may be granted.

Moreover, the introduction of semi- and fully-autonomous agents in AI-based services has yielded a new class of cyber threats. Whereas traditionally data exchanges across trust boundaries have been tightly controlled, e.g. via well-defined EDI interfaces and well-defined enterprise APIs between companies or organizations under the governance of traditional access controls to safeguard proprietary information and trade secrets, or via the use of cross-domain gateways for classified government applications, AI-based agents provide a new challenge due to the significant increase in complexity of their interactions. Autonomous orchestration of multiple agents specialized in specific subtasks further increases the difficulty of constraining agent-to-agent data exchanges across trust boundaries. Given the complexity and autonomous nature of agents, the permissible scope of an interaction requires much more granular and context-aware permissions, and for cross-trust-boundary exchanges optionally inspection and filtering of the data is needed to ensure e.g. specific trade secret information or classified information not be exchanged due to an unexpected agent behavior or a malicious agent extracting information e.g. via prompt or context injection or data poisoning. Furthermore, a governance system for AI agents managing authorization and control of data exchanges should be implemented in a highly resilient architecture to adequately protect the associated economic and business values potentially affected by agent misbehavior.

One drawback of currently-deployed resource access control systems is that a single entity is often charged with important transaction processing. For example, in the case of data management and distribution, a user may wish to access a file stored in a database. Access to the database may be managed by a single entity, such as a computer server or "node" that is programmed to authenticate and authorize the user for access to the database. While identification may be performed using known tokens (i.e., username/password combinations or public/private keys assigned to the user such as a FIDO keypair) managed by existing identity and access management systems (IAM service) with user and attribute databases, authorization by the computer server holding the data typically comprises an evaluation by the computer server only, i.e., the computer server may evaluate whether the user has provided a proper username and matching password or valid key and is listed as an authorized person against a list of authorized persons stored by the computer server. This single point of authorization may be compromised by another computer server intercepting communications between the user and the computer server (a "man in the middle" attack), by an malicious user with broad access rights (an "insider attack"), or by malicious software installed on the server itself to compromise its execution environment. As agentic AI introduces semi- or fully-autonomous agents acting on behalf of users or automated processes, robust authentication and authorization of both users and agents becomes much more important. As agents act on behalf of users, correct delegation of the user's permissions and capabilities within the organization is critical. This aspect of user-to-agent and agent-to-agent interactions becomes even more relevant as agents interact across trust boundaries, e.g. a supplier agent interacting with a customer agent across two companies, and have extensive capabilities in the form of data providers and effectors that may broadly reach into and alter company data and effect real-world actions.

Another problem with traditional authorization schemes is that they frequently only authorize users at a certain broad-scoped level. In the example above, authorization is described in terms of a general authorization to access every file in the database, or a broad subset, at any time of day, using any type of device, on any local-area network. There may be instances where an administrator may want to customize access for each file in the database so that only authorized persons, given other constraints, can access particular files, and any subsequent access can be uniquely identified and memorialized. Most state of the art IAM services impose limits on the relationship between a user account and the number of resources they can be associated with due to the underlying database implementation persistently storing users and their attributes. These limits represent a significant issue when AI agents' capabilities and skills are described, and agents act on behalf of other agents or users, requiring authorization based on an intersect of permitted actions and roles.

Yet another problem with traditional authorization schemes is that they do not establish contextual conditions under which a user may access a resource. For example, it may be desirable to only allow a user to access a resource at certain times of the day, in certain locations, when connected to only permitted local and/or wide-area networks. When dynamic agents interact with users and each other, such contextual conditions become even more important, e.g. a customer service agent may effect a refund payment autonomously based on the customer and product, whereas for other items a human user may have to authorize the refund first.

Thus, it would be desirable to authorize access to particular resources, such as AI agents, data providers and sources, effectors that trigger real-world transactions, etc., in a distributed fashion and enable more comprehensive descriptions of the possible contexts within which such access may be granted.

SUMMARY

The embodiments herein describe systems, methods and apparatus for providing autonomous AI agent governance, credential management, and secure inter-agent communications. In one embodiment, a method is described, comprising generating a root credential session and publishing the root credential session on an authorization blockchain network, the root credential session comprising a first sub-set of credential attributes of the initiating entity applicable to a policy of a first organization, defining a credential session template, the credential session template comprising a schema comprising a plurality of credential attributes associated with a transaction between any initiating entity and any provider entity, publishing a first credential session on the authorization blockchain network based on the credential session template, the first credential session identifying a second sub-set of credential attributes that form an intersection between the first sub-set of credential attributes in the root credential session with required credential attributes of the first provider entity required in order to interact with the first provider entity, evaluating whether the initiating entity's credential values associated with the second sub-set of the credential attributes of the initiating entity satisfy the required credential attributes of the first provider entity for an interaction between the two entities and processing, by the first provider entity, a prompt received from the initiating entity when the second sub-set of the credential attributes of the initiating entity satisfy the required credential attributes of the first provider entity.

In another embodiment, a system for providing autonomous AI agent governance, credential management, and secure inter-agent communications, is described, comprising a first AI agent for interacting with a user, a credential blockchain network for storing a first credential associated with the user and a second credential associated with the AI agent, an authorization blockchain network for storing a first credential session between the user and the first AI agent, the first credential session defining conditions needed in order for the user to interact with the first AI agent and chaincode, stored in a distributed fashion on the authorization blockchain network and executed by the authorization blockchain network, that causes the system to generate a root credential session and publish the root credential session on the authorization blockchain network, the root credential session comprising a first sub-set of credential attributes listed in the first credential applicable to a first organization, generate the first credential session based on a credential session template, the credential session template comprising a schema listing a plurality of credential attributes associated with transactions between any two entities in the system, the first credential session formed from an intersection of credential attributes of the first sub-set of credential attributes in the root credential session with credential attributes of the first AI agent stored in the second credential, the first credential session listing common credential attributes between the user and the first AI agent needed in order for the user to interact with the first AI agent, evaluate whether current credential attributes of the user satisfy at least one of the credential attributes listed in the first credential session and process, by the first AI agent, a prompt received from the user when at least one of the user's current credential attributes satisfies at least one of the credential attributes listed in the first credential attribute.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 4 is one embodiment of an authorization event template used in the resource access system shown in FIG. 1;

DETAILED DESCRIPTION

Systems, methods and apparatus are described for authorizing access to resources using distributed ledger technology. An issuing entity generates an authorization event template associated with a resource in control of the issuer and posts it to an authorization blockchain network. The authorization event template comprises one or more conditions under which a resource may be accessed, an identification of one or more user attribute objects and one or more permissions that prescribe how the resource may be managed. When a user requests access to a particular resource, a custom user attribute template may be retrieved from an authorization blockchain network in order to verify that the user is authorized to access the particular resource. After the user has been authorized to access the particular resource, an authorization record may be created based on the authorization event template and the custom user attribute template and. The user is then granted access to the resource. A "resource", as used herein, comprises any digital computer file in any form, such as a clear or encrypted pdf file, word file, digital photograph or video and audio recordings and real-time transmissions, meta-data pertaining to the resource, an executable file, account information, access to a remotely-executed software application, a stream of data, access to physical objects (i.e., an ability to issue commands or receive data) such as network-connected automobiles, aerial or underwater drones, rockets, military vehicles such as tanks, helicopters, armored personal carriers, submarines, etc. A resource may be stored in a single database or distributed on a network of computers, such as a peer-to-peer network or on a blockchain network.

Figure 1:
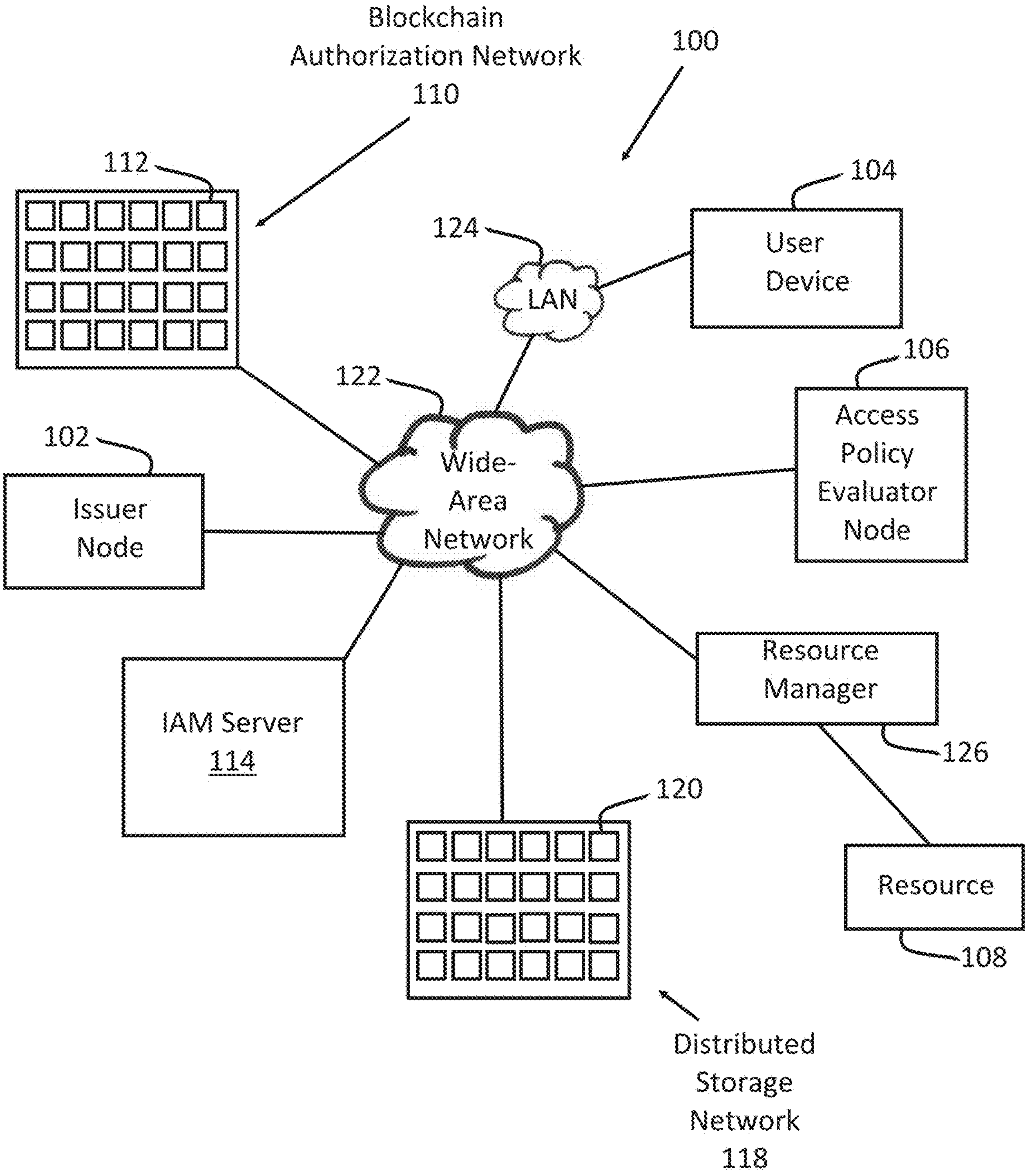
FIG. 1 is a functional block diagram of one embodiment of a resource access system.

FIG. 1 is a functional block diagram of one embodiment of a distributed resource access system 100. Shown is an issuer node 102, a user device 104, an access policy evaluation system 106, a resource 108, a blockchain authorization network 110 comprising a plurality of authorization nodes 112, a centralized identity and access control (LAM) server 114 configured to persistently and securely store unique user identities and any associated attributes such as a group membership, address, office location, etc., a distributed storage network 118 comprising a plurality of storage nodes 120, a wide-area network 122, a local-area network (LAN) 124 and a resource manager 126 A user may access resource 108 by using user device 104. User device 104 is typically a network-capable computer (such as a laptop or desktop computer, tablet, etc.), a computer-equipped vehicle such as a car, boat, airplane, helicopter, etc. or a personal mobile communication device (such as a cellular or satellite phone, wearable device, etc.). It should be understood that issuer node 102, user device 104, access policy evaluation system 106, resource 108, authorization nodes 112, and storage nodes 120 may each be referred to herein as a "computing node".

As mentioned above, resource 108 may comprise one of a variety of network-accessible clear or encrypted digital files, remote software applications, clear or encrypted digital information streams, clear or encrypted digital control streams, etc. In some embodiments, access to resource 108 is controlled resource manager 126, which comprises a node such as a computer server that receives requests for resources, evaluates the requests, and provides access to the resources if one or more conditions are satisfied, as will be explained in greater detail below.

Resource 108 may be stored by a single entity, for example, a digital file stored in a single database, or a communication link to a remote vehicle, or, in the case of a digital file, resource 108 may be stored across a distributed storage system such as distributed storage network 118. Distributed storage network 118 may comprise a peer-to-peer network or a blockchain network comprising a plurality of storage nodes. In the case of a blockchain network, each storage node 120 stores an encrypted copy of either a portion or an entire digital file(s) provided by resource 108, and tracks attributes of such files, such as a data and time of creation, modification or storage, an origination identifier describing a resource that generated the file(s), etc. Generally, when a majority of storage nodes 120 agree that valid data has been provided by resource 108, an immutable, linked, cryptographic "block" of data is produced and added to a chain of pre-existing blocks to form a blockchain. A storage node 120 may include the valid data directly in the cryptographic "block", or maintain separate "blocks" whereby one "block" contains the valid data's meta-data and cryptographic signature, and another "block" the actual valid data. The "blocks" may reside on the same blockchain, or on two distinct blockchains. It should be understood that each of the storage nodes 120 may apply a variety of integrity protection mechanisms for the actual data they store, e.g. each may apply blockchain techniques well known in the art, or hashing algorithms to establish ongoing integrity of the actual data, or store data in distributed blocks that are each hashed and aggregated into a Merkle tree, or use a database with built-in integrity validation, or any similar distributed data storage systems well known in the art that allow integrity data to be stored on storage blockchain network 118 for integrity validation independent of any mechanism implemented in an external data block storage.

It should be understood that although only one authorization node 112 and one storage node 120 is referenced in FIG. 1, and that each network is shown as having 24 nodes, in practice, a large number of nodes are used for each network, typically in the thousands or even millions. Similarly, while IAM server 114 is shown as a single entity, in practice multiple instances of such servers may be deployed for redundancy.

A "node" or "computing node", as used herein, comprises a networked computing device, for example a computer server or a smart mobile capable of communicating digitally with other nodes via wide-area network 122 and/or a local-area network (LAN) 124. Such computer servers may be hosted in a traditional data center or be part of an embedded edge computing device. Wide-area network 122 comprises a plurality of routing nodes that route signals typically over great distances and among the various nodes of each network, typically comprising the Internet. LAN 124 comprises a computer network that interconnects computers within a limited geographic area, such as a home, a school, an office, etc. A typical example of LAN 124 comprises a Wi-Fi modem/router combination.

Issuer node 102 is responsible for creating an "authorization event template" for each resource to be accessed by users of resource access system 100 and for distributing the authorization event templates to nodes 112 of blockchain authorization network 110. The authorization event template defines "conditions" under which a user may access a particular resource and, in some embodiments, "permissions" that specify how the resource may be managed, i.e., whether a document can be printed, whether the document can be shared with others, etc.

The "conditions" comprise one or more constructs that generally must be true in order for an authorized user to actually access the resource. For example, in a highly classified setting, a user may request an encrypted document from a government database. An authorization event template may have been pre-issued and stored across all nodes 112 of blockchain authorization network 110 in association with the particular encrypted document, the authorization even template comprising one or more conditions in order for the user to view the document. For example, the requested document may have three conditions attached to it, and all three must be true in order for the user to view the document on a screen of user device 104: (1) that user device 104 is a device authorized by the government to view the document, (2) that the user is actually looking at the display screen of user device 104, and (3) user device 104 is accessing the document via an authorized local-area network (i.e., a secure LAN within a particular government office building, for example).

Issuer node 102 may generate authorization event templates comprising conditions needed to access a particular resource based solely on user attributes defined in IAM server 114. In other cases, more complex user attributes/conditions may be needed, over-and-above attributes/conditions supported by IAM server 114. In this case, user attribute object may be used to extend the user attributes/conditions defined in LAMv server 114 with additional custom attributes as defined by the user attribute object. In this case, issuer node 102 may create user attribute objects for controlling access to different resources, each user attribute object comprising certain attribute types associated with specific users in order to access a particular resource. Each user attribute object may be stored in one or more cryptographic blocks of a blockchain network, or channel, such as authorization blockchain network 110. An identification of one or more user attribute object, and/or an identification of one or more associated cryptographic blocks stored on authorization blockchain network 110, may be stored in an authorization event template associated with a particular resource. In this way, when a resource request is received, an authorization event template associated with the requested resource may be retrieved and a particular user attribute object can be identified and retrieved, for determining whether the requesting user may access the resource.

When a user wishes to access a resource using user device 104, the user enters a request into user device 104 to access the resource. The request may comprise a resource identifier that uniquely identifies the resource, and one or more user attributes that allow a verifying entity, such as access policy evaluator system 106, to verify that the user is authorized to access the resource. In this example, the request is sent by user device 104 to access policy evaluator system 106 via LAN 124 and wide-area network 122. System 106 comprises one or more servers, computers, nodes, or other processing devices capable of authenticating users during resource requests. In one embodiment, system 106 comprises a single computing platform, such as a web-based server. In other embodiments, system 106 comprises a distributed system, for example one or more blockchain systems, or blockchain channels, for validating user requests for access to resources in system 100 and memorializing such requests in cryptographic blocks stored on a blockchain network or on a blockchain channel. In another embodiment, system 106 comprises chaincode that is executed on each of a plurality of nodes on a blockchain system.

When the request is received by access policy evaluator system 106, access policy evaluator system 106 may authenticate the request to determine if it actually originated from the person who purportedly sent the request. Well-known public key cryptography techniques may be used to authenticate the user, such as using a private/public key combination. Once the user is authenticated, access policy evaluator system 106 determines whether the user is authorized to access the resource. This determination may be based on user attributes and their values maintained in and provided solely by IAM server 114, and/or additional custom user attributes published for the requesting user on authorization blockchain network 110 in a user attribute object. In this latter case, the applicable user attributes for determining access may be retrieved from the particular, user attribute object stored in a cryptographic block on authorization network 110, in addition to any attributes provided by IAM server 114. This determination may be accomplished using a number of different techniques, described later herein.

If the user is authenticated and authorized to access the document, access policy evaluator system 106 retrieves the authorization event template stored on blockchain authorization network 110 using the resource ID of the requested resource, and creates an authorization record based on the authorization event template, an identity of the user requesting access to the resource, the resource ID and in some embodiments, a signed token that is used by a user to access a resource. The authorization record typically contains all of the conditions and permissions that pertain to accessing and managing the resource. The authorization record is stored across the nodes 112 of authorization blockchain network 110 as a verified transaction in accordance with well-known blockchain protocols.

Once the authorization record has been created, access policy evaluator system 106 may obtain a network address, such as a URL, to the resource either directly from resource 108 or from distributed storage network 118, and then provides the authorization record to user device 104. User device 104 may then use the URL to retrieve the resource itself. Alternatively, access policy evaluator system 106 may package the authorization record directly together with the resource. In either case a dedicated encryption key may be applied to the resource for each URL-based or directly packaged access. User device 104 then determines whether the conditions to access the resource are currently being satisfied, such as determining whether user device 104 is authorized to access the resource, determining whether the user is currently looking at a display screen of user device 104, determining an IP address assigned to user device 104 (for purposes of determining whether user device 104 is operating in an authorized local-area network), etc. If all of the conditions listed in the authorization record are satisfied, the resource is provided to the user, i.e., decrypted and displayed on a display screen of user device 104 or otherwise presented in a format that the user may view or hear. If not, the resource is not provided to the user, i.e., not shown on a display screen, not decrypted, etc. If the user wishes to manage the resource, for example, wishes to print a document, store a document on a hard drive or on a removable memory device, play an audio file or audio stream through an audio speaker, display a file or streaming video visually on a display screen or wearable display, etc., user device 104 determines whether the user has permission to do so, based on the authorization record stored in user device 104. If so, user device 104 allows the user to manage the resource. If not, the user is denied permission.

User device 104 may continue to determine whether all of the conditions specified in the authorization record are being satisfied on an ongoing-basis. Generally, if at any time at least one of the conditions are not presently being satisfied, user device 104 may deny further access to the resource, i.e., cease displaying a document, cease streaming audio to a speaker of user device 104, re-encrypt a documents, etc.

Figure 2:
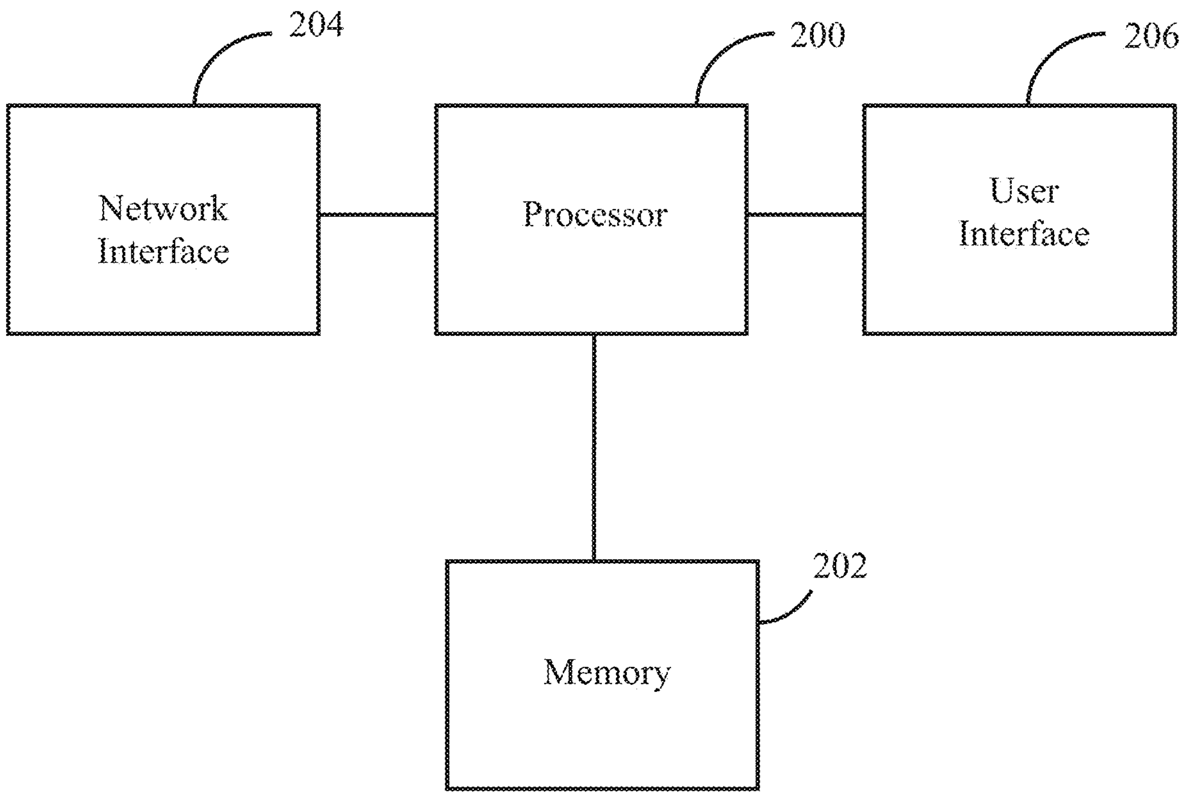
FIG. 2 is a simplified functional block diagram of any of the nodes or the policy evaluator as shown in FIG. 1.

FIG. 2 is a simplified functional block diagram of any of the nodes shown in FIG. 1, as well as access policy evaluation system 106, comprising processor 200, information storage device 202, network interface 204 and user interface 206 (in some cases).

Processor 200 is configured to provide general operation of each node and evaluation system 106 by executing processor-executable instructions stored in information storage device 202, for example, executable computer code. Processor 200 typically comprises one or more general or specialized microprocessors, microcontrollers, and/or customized ASICs, selected based on computational speed, cost, power consumption, and other factors relevant to each node.

Information storage device 202 is coupled to processor 200 and comprises one or more non-transitory information storage devices, such as static and/or dynamic RAM, ROM, flash memory, or some other type of electronic, optical, or mechanical memory device. Information storage device 202 is used to store processor-executable instructions for operation of each node, respectively. It should be understood that in some embodiments, a portion of information storage device 202 may be embedded into processor 200 and, further, that information storage device 202 excludes propagating signals.

Network interface 204 is coupled to processor 200, comprising circuitry for sending and receiving packetized data to/from other nodes in resource access system 100 via wide-area network 122 and local-area network 124.

User interface 206 is coupled to processor 200 and allows a user to "consume" resources, i.e., to view or listen to resources, and enter various commands, such as control commands to operate a remote, aerial drone, and requests to manage resources, such as requests to print, edit, forward, display, play, render or decrypt resources. User interface 206 may comprise one or more pushbuttons, touchscreen devices, biometric readers, switches, sensors, keypads, and/or microphones that generate electronic signals for use by processor 200 upon initiation by a user. User interface 206 may alternatively, or additionally, comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of resources to a user.

Figure 3A:
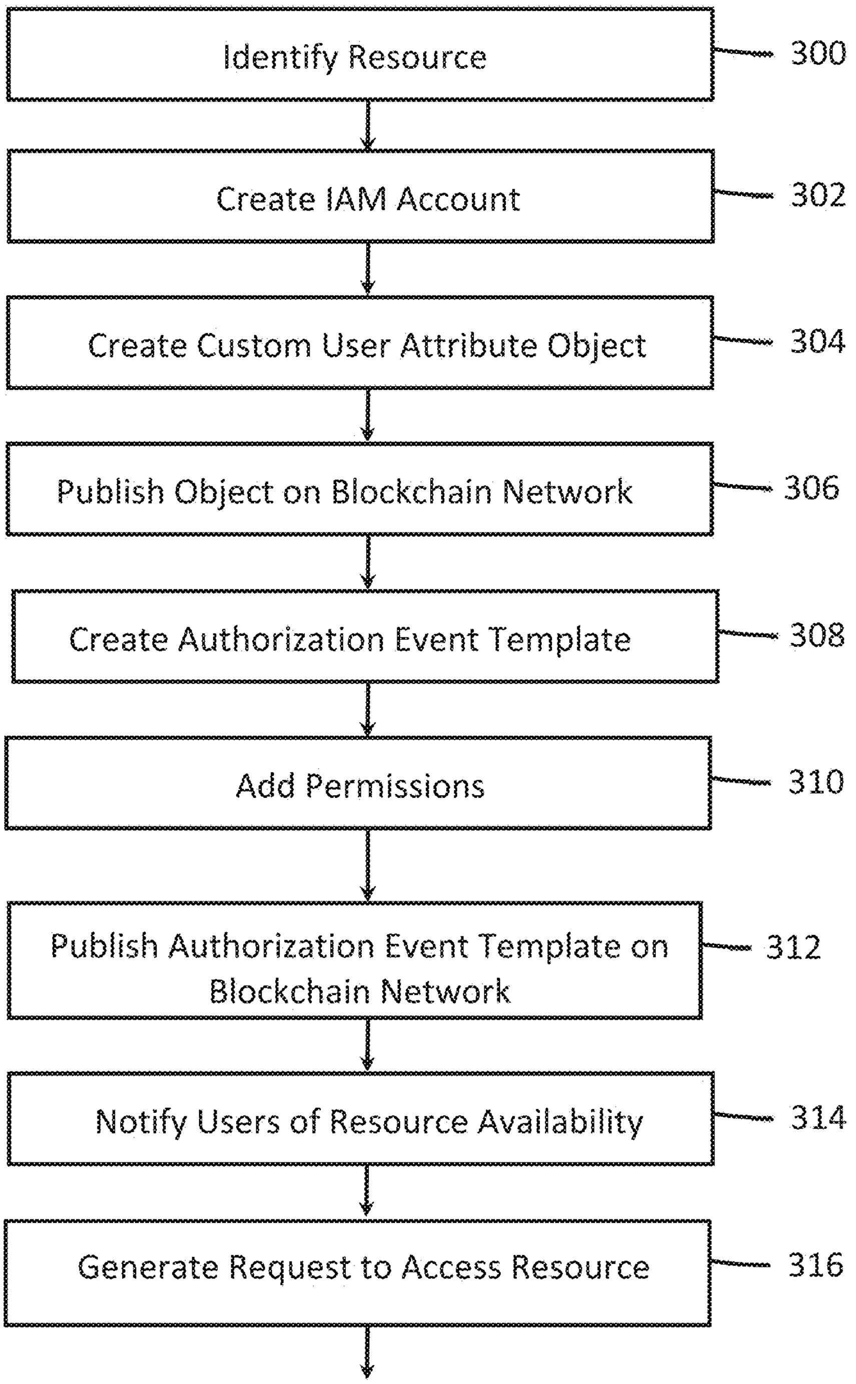
FIGS. 3A-3C depict a flow diagram illustrating one embodiment of a method, performed by the nodes of the resource access system and the policy evaluator as shown in FIG. 1, for accessing a resource in the system by evaluating IAM-based attributes stored in an IAM server and custom user attributes stored in a user attribute object on the blockchain network as shown in FIG. 1.
Figure 3B:
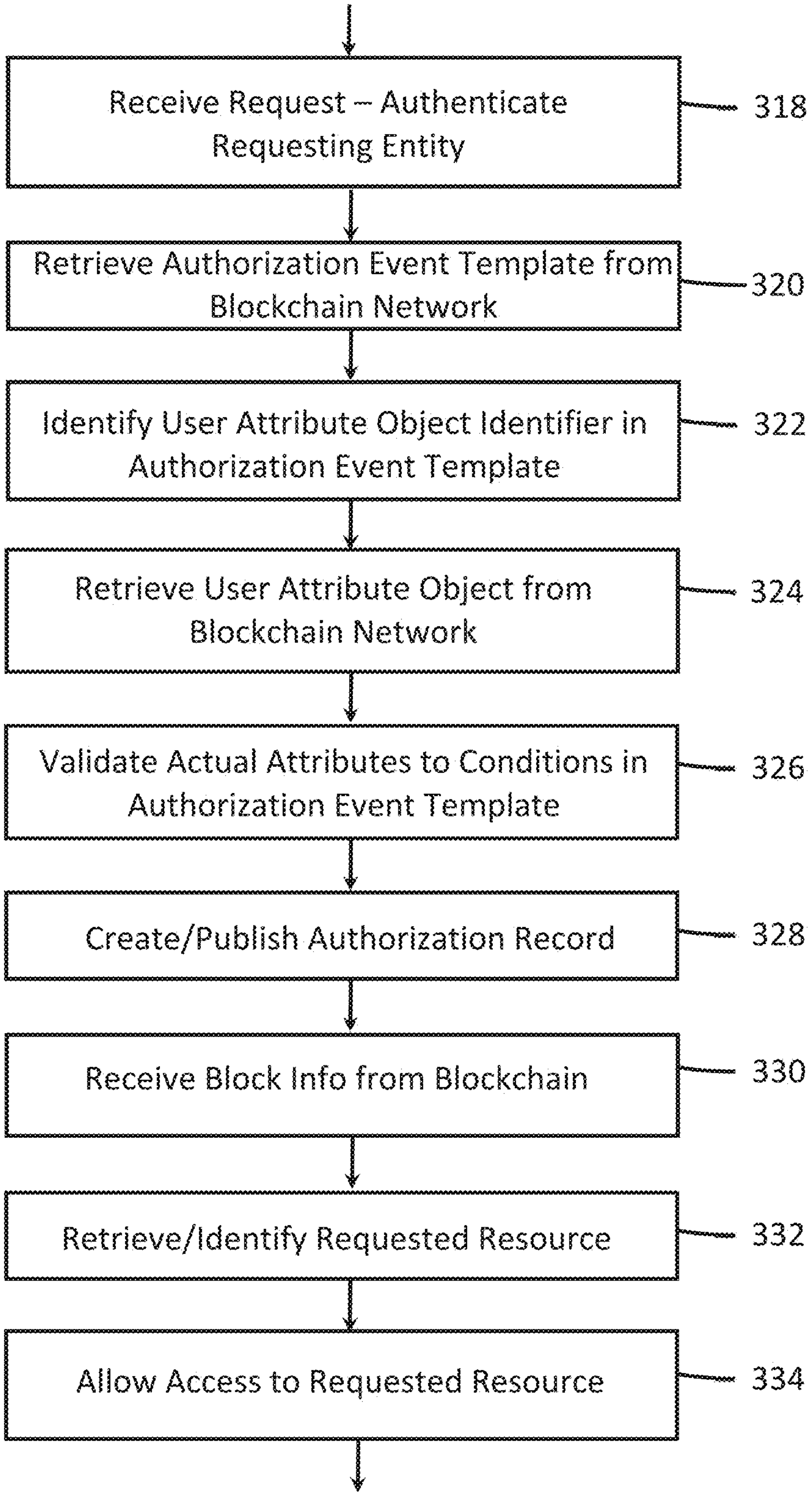
Figure 3C:
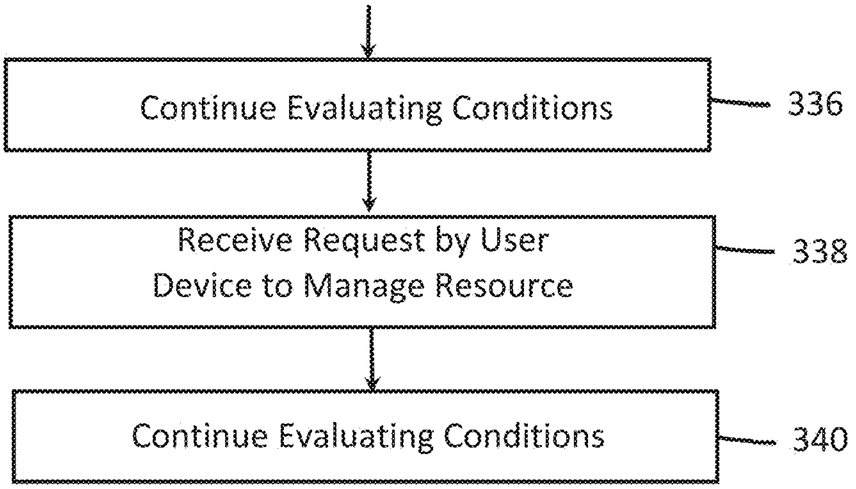

FIGS. 3A-3C depict a flow diagram illustrating one embodiment of a method, performed by one or more nodes of resource access system 100 and evaluation system 106 for accessing a resource using conditions defined by an authorization record stored on authorization blockchain network 110. and, in some embodiments, in a user attribute object also stored on authorization blockchain network 110. More specifically, the method describes operations performed by processor 200 in each node, each executing processor-executable instructions stored in a respective information storage device 202. It should be understood that in some embodiments, not all of the steps shown in FIG. 3 are performed, and that the order in which the steps are carried out may be different in other embodiments. It should be further understood that some minor method steps have been omitted for purposes of clarity.

At block 300, a resource is identified by an "issuer entity", such as a government agency, a health care provider, an insurance company, or some other organization in control of one or more resources. For example, resource 108 may comprise a series of digital photographs or videos, a classified document, a data stream from an aerial drone, a database, etc. Resource 108, in whatever form, may be provided to distributed storage network 118, where it is immutably recorded in one or more cryptographic blocks of distributed storage network 118, in accordance with well-known distributed ledger technology. Generally, the issuer entity is notified after the resource becomes available if the issuer entity did not create the resource. The resource may be assigned a global identifier or "GUID", which is a unique, cryptographically verifiable, machine-readable code for uniquely identifying the resource in resource access system 100.

At block 302, the issuer entity may create an account for each user of system 100 in IAM server 114 listing one or more attributes of each user. For example, the issuer entity may create one or more roles and/or claim definitions in IAM server 114 for each user of system 100, Each account created may comprise one or more fields arranged in accordance with particular user attributes or group memberships stored in, i.e., Microsoft EntraID, or some other well-known schema arrangement. For example, each account may comprise fields for a user name, password, other security credential types, a clearance level, a field for an EntraID group membership/realm/scope/organization/ID of a particular user, etc. In one embodiment, the schema may rely solely on user attributes and group associations defined in an IAM service associated with IAM server 114.

At block 304, for each user in system 100, the issuer entity may define a set of custom attributes (e.g. attributes not supported by the IAM service associated with IAM server 114) associated with each user and, in some embodiments, custom user conditions for accessing and, in some embodiments, managing, certain resources. In one embodiment, the issuer entity first defines a template comprising schema and a listing of all attributes used in system 100 to authorize access to resources in system 100. For example, the template may comprise a name field, an address field, a phone number field, a present location field, a rank field, a device type field, a device make field, a device model field, and/or any other fields that may be processed by system 100 to authorize access to resources. For each user, the issuer entity uses the template to create a custom user attribute object containing selected fields from the template and populating the selected fields with up-to-date information associated with each user, such as each user's name, address, phone number, email address, rank, an identification of any devices 104 each user is in possession, etc. The issuer entity may additionally add one or more custom user conditions and/or permissions for accessing and/or managing one or more resources, such as requiring that a user be located in certain places while accessing sensitive resources, that the user be using a particular device type, make and model to access certain resources, that the user may only print sensitive material while located in one or more particular places, that the user may forward a file to another entity, etc. Thus, each user attribute object may comprise a list of attributes types and associated attribute values, including, in some cases, one or more conditions and/or permissions required for accessing particular resources.

As a specific example, a user attribute object may comprise a custom user condition comprising a data consumption attribute type listing a condition identifying a particular user device 104 make and model needed to access a particular resource. In other examples, the custom user conditions needed to access/transfer/consume/user modality of the resource for a particular requesting entity might comprise one or more of a requirement to use a private satellite communication network, that user device 104 be in a pre-authorized location (such as a private vs a public place), that a software application for viewing/accessing the resource is open, that an expiration time to access the resource has not expired, etc.

At block 306, after each user attribute object has been created, the issuing entity may submit each user attribute object to one of the nodes 112 of blockchain authorization network 110 via issuer node 102, where it is then provided by node 112 to all of the other nodes 112 of blockchain authorization network 110 in accordance with well-known blockchain protocols. A public key may be generated that is part of a private/public key pair generated by the issuer entity, used by other nodes in resource access system 100 to verify that the issuer entity is the one who issued each user attribute object. Thus, each user attribute object is stored in a distributed fashion in authorization blockchain network 110 and publicly accessible by any node in resource access system 100. Specifically, each user attribute object is stored as part of one or more encrypted blocks in authorization blockchain network 110, the cryptographic block(s) comprising an identification indicator that uniquely identifies the block(s) in authorization network 110, such as a "block index" or a digital fingerprint derived from a block's data (transactions, timestamp, etc.), and a reference (a hash) to a previous block. This block identification indicator may then be provided to the issuing entity for inclusion in an authentication event template associated with each particular resource.

At block 308, the issuing entity causes an authorization event template to be created in association with a resource. The authorization event template typically comprises an identification of the resource, an address where the resource may be accessed (i.e., a URL), an identification of attribute types and associated attribute values and/or conditions needed to access the resource. For example, in order to access a secure database, the issuing entity may create an authorization event template named "Database487", with a URL of http://www.IAM114.com:19aa07b3997cbd38993aaf7f890, and two requirements needed in order to access the secure database: a requirement that a requesting entity be a member of a "secured_users" group as stored by IAM server 114, and that the requesting entity be located inside one of three secure buildings (identified by GPS coordinates, for example). The authorization event template may additionally comprise an identification of the issuing entity, an issuance date of the authorization event template, and an expiration date of the authorization event template (i.e., a time/date when the resource may no longer be accessed).

A non-exhaustive listing of attributes types comprise the following:

- Access to a physical file storage ledger (such as distributed storage network 118)
  - Access confined to file/directory listings
  - Access confined to specific files
  - Access confined to encrypted file data
  - Access confined to re-encrypted file data with an on-demand key
  - Access confined to clear file data
- Transfer of the data
  - Access confined to one or more local secure private networks (physically separated)
  - Access confined to one or more local secure private networks (logically separated via encryption)
  - Access confined to one or more wide-area secure private networks (physically separated)
  - Access confined to one or more wide-area secure private networks (logically separated via encryption)
  - Access confined to one or more virtual private networks over non-trusted public network
  - Access confined to one or more network paths (routing) w/o DNS or routing lookups (no digital footprint on 3rd party services)
  - Access confined to one or more time windows
  - Access confined to any of the above in conjunction with noise traffic generation, i.e., a purposefully-generated noise floor of useless encrypted data being exchanged ongoingly, so that the real access is not obvious to an observer of the encrypted traffic stream
  - Access confined to any of the above with transmission regulated to sparse bursts, randomized bursts, or continuous bandwidth-regulated transmission, i.e., the timing of transmissions may be prescribed by underlying link capabilities and noise characteristics
- Consumption of the data (i.e., by user device 104):
  - One or more identifications of devices authorized to receive and manage a resource
  - One or more identifications of operating systems authorized to run an app for accessing the resource
  - One or more identifications of a level of sandboxing of a consuming application (i.e., one or more operating systems such as Windows or Linux/Mac, one or more browser/web apps, one or more authorized device types, i.e., iOS device, Android device, one or more dedicated virtual machines/dockers to run an app, one or more dedicated hardware nodes to run an app)
  - One or more identifications of ways to handle data decryption keys (i.e., dedicated secure elements (with specific Common Criteria level), a virtual SE/ARM TrustZone, a dedicated processor, logically or physically separated secure memory)

User modalities

User auth required (level, how recent, single or two-factor auth, CAC auth (common access card) or other smart card required)

User location (defined by geofence or class of location, e.g. office, home, personal vehicle, public transport, public area)

Time of day windows

User presence (fingerprint every x seconds, face recognition every x seconds, face recognition in conjunctions with continuous video tracking or other gaze detection)

User device handling (motion sensors to discern holding user device 104 vs lying e.g. on a table or in a bag)

At block 310, the issuing entity may add one or more permissions to the authorization event template, such as whether a requesting entity may print a document, whether a requesting entity may forward a file to another entity, whether a file can be copied to a physical storage device such as a hard drive, external storage device, removable storage device, whether a document may be converted into another format, such as from Word to a PDF document, whether the resource may be handled by a synchronization service (e.g. iCloud), whether a requesting entity may edit a document, whether a requesting entity may play an audio file or audio stream through an audio speaker, whether a requesting entity may display a file or streaming video visually on a display screen or wearable display, etc.

An example of an authorization event template is shown in FIG. 4, which is typically written in a programming and data templating language specific to a blockchain's chain code such as Python, Java, Go, JSON, XML or similar, where line 8 identifies the issuing entity, line 9 identifies an issuance date, line 10 identifies an expiration date of the authorization event template, lines 11-12 identifies the resource (in one embodiment, a GUID of the resource), line 13-16 identifies IAM-based conditions needed to access the resource, line 17-29 identifies custom user attribute-based conditions needed to access the resource. In this example, in order to access the resource located at "http://ares-customer.com/resources/3732", a user must belong to a group called "Senior Executives" at Ford Motor Company, using a particular, secure communication network 399AE338, and located in one of three predetermined locations (in GPS coordinates). Line 32 identifies the signed token used to access the resource, as described later herein, identified as "pkNonce".

At block 312, after the authorization event template has been created, the issuing entity may submit the authorization event template to one of the nodes 112 of blockchain authorization network 110 via issuer node 102, where it is then provided by node 112 to all of the other nodes 112 of blockchain authorization network 110 in accordance with well-known blockchain protocols. A public key may be generated that is part of a private/public key pair generated by the issuer entity, used by other nodes in resource access system 100 to verify that the issuer entity is the one who issued the authorization event template. Thus, the authorization event template is stored in a distributed fashion in authorization blockchain network 110 and accessible by evaluator system 106.

At block 314, the issuer entity may notify one or more users in system 100 that a resource associated with the newly-created authorization event template is available by sending a message via wide-area network 122, local-area network 124 to user device(s) 104.

At block 316, a user of a requesting entity, such as a user of user device 104, a node, an AI agent, etc., requests access to the resource by sending a resource request to access policy evaluator system 106 via local-area network 124 (if applicable) and wide-area network 122. The request comprises an identification of the requested resource, in one embodiment a GUID of the resource, and authentication information, such as an authentication token.

At block 318 access policy evaluator system 106 receives the request and may either authenticate the entity that sent the request or forward the authentication information to IAM server 114. A typical authorization technique is to evaluate user credentials, such as a username and password to a list stored by access policy evaluator system 106, or IAM server 114, to see if the user entered a correct password that matches the user's username. Another well-known technique is to evaluate an authentication token sent by user device 104. Another well-known technique is to require the user to provide personal identification information, such as a digital finger print, retinal scan, voice scan, three-dimensional facial recognition, or some other biometric information for evaluator system 106, or IAM server 114, to match the personal identification information to pre-stored personal identification information in either evaluator system 106 or LAM server 114. Another well-known technique is to require the user to provide a One-Time Password (OTP) or a PIN the user received via a separate delivery mechanism, e.g. a text message, an email, or other secure delivery channel, and to provide the same OTP or PIN to evaluator system 106 for comparison. If authentication is performed by IAM server 114, evaluator system 106 may forward the user credential, personal identification information and/or an authorization token to LAM server 114, and IAM server 114 evaluates this information in order to authenticate a requesting entity associated with device 104 that initiated the request. When authentication is successfully completed, IAM server 114 may generate a new authentication token comprising additional claims, i.e., pre-stored data values (i.e., "IAM attributes) stored in association with the requesting entity, and send the new authentication token to evaluator system 106.

At block 320, evaluator system 106 may retrieve an authorization event template from authorization blockchain network 110 associated with the requested resource.

At block 322, evaluator system 106 may evaluate the authorization event template to identify any user attribute objects associated with the requested resource stored in one or more cryptographic blocks of block chain authorization network 110.

At block 324, access policy evaluator system 106 may retrieve a user attribute object identified in the authorization event template by retrieving one or more cryptographic blocks from authorization blockchain network 110. The block(s) are then decrypted in order to access the user attribute object.

At block 326, in one embodiment, access policy evaluator system 106 may validate the IAM-based conditions and the custom user conditions identified in the authorization event template against the IAM attributes received from IAM server 114 and the custom user attributes in the user attribute object and, in some embodiments, validate one or more custom user conditions specified in the user attribute object.

In another embodiment, chaincode running on authorization blockchain 110 may determine whether all of the IAM-based conditions and the custom user conditions have been met, i.e. by comparing the actual IAM-based user attributes and the custom user attributes of the requesting entity to the IAM-based conditions and the custom attribute conditions in the authorization event template and, in some cases, in the user attribute object. Upon determination that the conditions have been met, the chaincode may publish an indication of such to blockchain authorization network 110, which may execute a smart contract that may verify that the particular node is a valid evaluator so that the consensus mechanism of blockchain authorization network 110 can ensure that the conditions have been met. In a related embodiment, the particular node may provide an indication that only some of the conditions are being met, while other conditions are verified by other nodes. In this case, each of the verifying nodes provides one or more indications to the smart contract, and the smart contract verifies when all of the conditions have been met. In another related embodiment, the conditions may be grouped into rules enforceable by a single node each. This eliminates the need to cross-check with all involved nodes whether all conditions are met for the requested access. In this case, before forwarding the resource from one node to another, a sending node evaluates any conditions in the authorization record pertinent to that node, and only if the condition(s) is/are met does the sending node forward the resource to the next node in the chain. This continues from a source node (for example, resource manager 126) to a destination node (for example, user device 104). In this way, when the resource reaches the destination node, it implies that all of the conditions have been met, and the destination node may present the resource to the requesting entity.

In yet another embodiment, user device 104 may be used to verify at least some of the custom user conditions. In this embodiment, after evaluator system 106 has retrieved the authorization event template, and after it has verified the IAM-based conditions against the actual IAM attributes of the requesting entity, evaluator system 106 may send the un-verified custom attribute conditions to user device 104. User device 104 may either evaluate the conditions to determine if they are currently being met, using a trusted client application being executed on user device 104, or send a response to evaluator system 106 with information needed for evaluator system 106 verify the conditions, such as a current location of user device 104, an identification of a make/model of user device 104, an identification of a local network in use by user device 104, an IP address currently being used by user device 104, etc. In one embodiment, evaluator system 106 may be co-located with or integrated into the trusted client application being executed on device 104.

At block 328, after access policy evaluator system 106 has validated the conditions in the authorization event template and, in some embodiments, the custom user conditions stored in the user attribute object, access policy evaluator system 106 may cause an authorization record to be created based on the authorization event, comprising an identification of the resource, an identification of the requesting entity, a listing of the conditions and permissions needed to access and manage the resource and the requesting entity's actual attributes for accessing the resource. In one embodiment, the authentication record comprises a signed token for use by the requesting entity to access the resource and for nodes 112 of blockchain authorization network 110 to authenticate the authorization record. The authorization record is then submitted to all of the nodes 112 of the authorization blockchain network 110 after a majority of nodes 112 verify the authorization record in accordance with well-known blockchain protocols.

At block 330, after the authorization record has been posted to authorization blockchain network 110, one of the nodes 112 may provide feedback to access policy evaluator system 106 indicating that the authorization record has been posted as a block of a blockchain managed by authorization blockchain network 110, as well as the authorization record itself.

At block 332, access policy evaluator system 106 may retrieve the resource either directly from resource 108 or from distributed storage network 118. In another embodiment, the resource is referenced by a network address, such as a URL, listed in the authorization record. Access policy evaluator system 106 may also retrieve the authorization record from authorization blockchain network 110.

At block 334, access policy evaluator system 106 provides the authorization record and in some embodiments, the resource, or a link to the resource, to user device 104 via wide-area network 122 and local-network 124. The resource may be provided as-is, or protected for this access with additional cryptographic methods for data confidentiality and integrity.

At block 336, one or more nodes of system 100 determines whether the conditions to provide the resource to the requesting entity continue to be satisfied, such as determining whether the requesting entity is currently looking at a display screen of user device 104, determining whether user device 104 continues to operate in an authorized geographic location, whether user device 104 continues to be handled in an authorized manner (i.e., whether user device 104 vs lying e.g. on a table or in a bag), etc.

In some cases, one or more of the ongoing conditions are verified by one node, and one or more other conditions are verified by one or more different nodes. For example, if the authorization record indicates that the requesting entity must be looking at the screen and also that the resource may only be provided to one or more identified IP addresses, user device 104 may continually, or periodically, determine if the requesting entity is currently looking at a display screen of user device 104, while resource manager 126 may determine if a request to provide the resource comprises one of the one or more identified IP addresses listed in the authorization record In one embodiment, each node is provided with a requesting entity GUID and resource GUID as the request to access the resource is routed through network 100 from one node to another, from user device 104 to resource manager 126, for example. The GUIDs identify an authorization record identified associated with the request that was published to the blockchain authentication network 110 previously. Each node references the conditions in the authorization record (in some embodiments, retrieving and storing the authorization record internally), and evaluates any conditions that are relevant to each particular node in a chain of nodes that are used to deliver the resource. For example, resource manager 126 is responsible for providing the resource from a database, for example, to wide-area network 122, routers of wide-area network 122 are responsible for routing the resource in accordance with well-known networking principles, a router that is part of local-area network 124 is responsible for routing the resource from wide-area network 122 to user device 104, and user device 104 is responsible for receiving the resource from local-area network 124 and providing it to the requesting entity. Each one of these nodes may need to verify a condition particular to each node. For example, the authorization record may state that the resource may only be accessed when user device 104 is connected to a particular IP address while the user is looking at user device 104. Resource manager 126 and the routers of wide-area network 122 may each determine that an IP address in a resource request received from user device 104 matches the allowed IP address listed in the authorization record for the particular resource being requested. User device 104 determines whether the requesting entity is currently looking at the display screen. When the conditions listed in the authorization record are satisfied, as determined by each node in the chain of delivery of the resource, is the resource provided to the requesting entity. In one embodiment, when each node in the chain of delivery verifies one or more conditions listed in the authorization record, each node may report such verification by sending a "transaction" to blockchain authorization network 110, where a smart contract verifies the transaction and is published by all of the nodes 112 of blockchain authorization network 110. When each node has confirmed that the conditions of the authorization record have been satisfied, a block is published that indicates that all of the conditions have been met, and device 104 can access the block to know if it can provide the resource, due to the fact that other nodes have verified one or more conditions not verified by user device 104.

At block 338, processor 200 of user device 104 may receive a request from the requesting entity to manage the resource, for example, a request to print a document, store a document on a hard drive or on a removable memory device, etc. Processor 200 determines whether the requesting entity has permission to do so, based on the authorization record stored in memory 202 of user device 104. If so, processor 200 allows the requesting entity to manage the resource. If not, processor 200 denies the request and generally notifies the requesting entity.

At block 340, processor 200 may continue to determine whether all of the conditions specified in the authorization record are continuously being satisfied. Generally, if at any time at least one of the conditions are not presently being satisfied, processor may deny further access to the resource, i.e., by blanking the display screen, interrupting a remote networking session, interrupting a data stream, deleting a local copy of a document, etc.

An invention related to the above is embodied in a systems, method and apparatus for providing autonomous AI agent governance, credential management, and secure inter-agent communications. An issuing entity generates a credential session template comprising a schema that contains credential attributes that are used in any interaction between two entities in the system. When a requesting entity initiates a particular interaction with a target entity, a "root credential session" is created in association with the requesting entity, comprising a sub-set of all credential attributes assigned to a requesting entity are in accordance with one or more "policies" of one or more organizations the requesting entity belongs to. The root credential session may then be published on an authorization blockchain network. As used herein, the term "blockchain network" may refer to a distinct and separate group of processing nodes comprising a blockchain network or it may refer to a particular channel of a blockchain network, where each channel is logically separated from other channels. Chaincode operating on the authorization blockchain network may retrieve the root credential session and perform an "intersection" between the credential attribute types in the root credential session with required credential attributes of a target entity that defines conditions required to interact with the target entity. The resulting "intersected credential attributes" are then published as a "credential session" on the authorization blockchain network and the credential session governing future interactions between requesting and the target entities. Prior to any subsequent interaction, the attributes in the credential session may be evaluated by chaincode to determine if the requestor's current credential attribute values listed in the credential session satisfy at least one credential attribute of the target entity in order to interact with the target entity. When at least one of the requesting entity's credential attribute values satisfies at least one credential attribute of the target entity, one or more interactions between the requesting entity and the target entity may occur, in accordance with the credential attributes listed in the credential session, i.e., conditions and permissions for governing interactions between the two entities. Before or during each interaction, each of the requesting entity and the target entity may access the credential session on the authorization blockchain network and conduct an interaction accordingly. By memorializing the credential session on the authorization blockchain network, both parties have an immutable reference to the applicable credential attributes governing their interactions. The blockchain can be viewed as an immutable cache of the applicable credentials, and also serves to memorialize the rules under which any interaction took place for later analysis.

The advantages of the embodiments described herein are numerous. First, because robust authentication and authorization of both users and agents becomes much more important with the use of semi- or fully-autonomous agents, especially across trust boundaries, the use of blockchain technology avoids single point failures, and adds non-repudiation properties to credential sessions and any interactions committed thereunder. Second, the embodiments described herein permit individual agent access under a wide variety of conditions and permissions, not just blanket authority to use agents a certain broad-scoped level. Third, access to agents may be defined based on contextual conditions under which a user may access a resource. When dynamic agents interact with users and each other, such contextual conditions become even more important, e.g. a customer service agent may effect a refund payment autonomously based on the customer and product, whereas for other items a human user may have to authorize the refund first.

In addition to the previous definition of a "resource", this term may additionally comprise entities such as a data source, a data sink, an API available to invoke remotely, an effector which is an API interfacing with real-world entities (e.g. a payment system, an ordering system, etc.), or an interface to another entity supporting a well-defined protocol to coordinate remote interactions such as AI agent-to-agent interactions. Data sources and sinks may be implemented as streaming endpoints, databases, files, memory, decentralized storage such as distributed file systems of blockchain and the like. APIs may be implemented as service endpoints over well-known protocols, such as HTTP or TLS, and facilitate invocation of a service function from another networked node. Service functions may be in the form of typical server nodes, e.g. a database service, or integrated with real-world functionality such as performing a payment, ordering physical goods, instructing a robot to perform a specific action, and the like. APIs may include definitions of authorization schemes to prove to the service that another networked node is permitted to access and invoke such an API. Protocols may be implemented to facilitate one or a series of interactions representing a larger interaction, and may use well-known transport mechanisms such as RPC, JSONRPC, etc.

Protocols typically include authorization schemes to manage permissions for specific interactions, and negotiation schemes to agree on relevant capabilities to be used as part of the interaction. Two examples are the Agent2Agent protocol (A2A) developed by Google and the Linux foundation, and the Model Context Protocol (MCP) developed by Anthropic. The mechanisms described in this embodiment apply to any similar concepts whereby two or more entities interact for the purpose of exchanging resources or information under the governance of an access policy.

Figure 5:
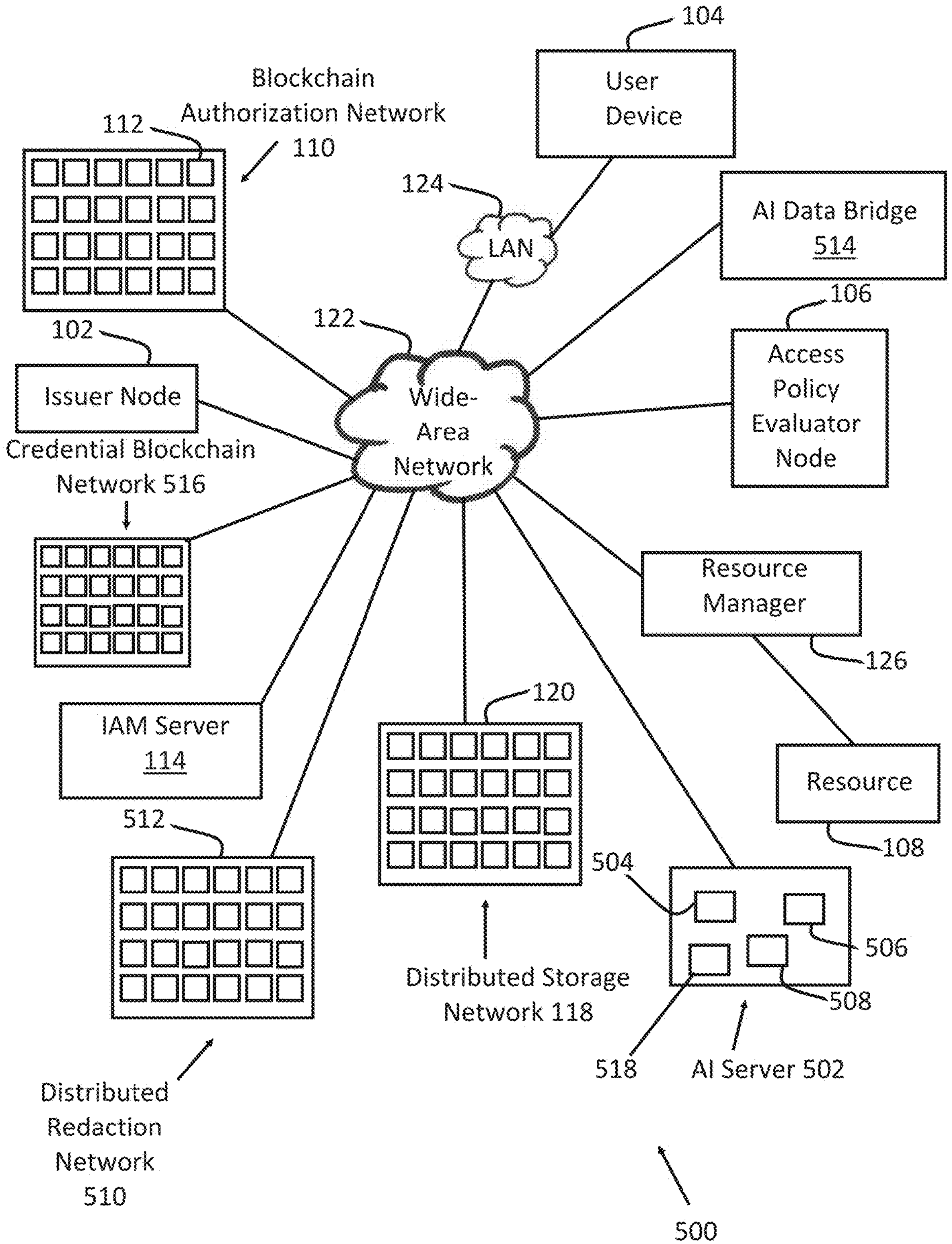
FIG. 5 is a functional block diagram of one embodiment of a system for providing autonomous AI agent governance, credential management, and secure inter-agent communications.

FIG. 5 is a functional block diagram of one embodiment of a distributed resource access system 500 comprising at least some of the entities shown in FIG. 1, plus an artificial intelligence (At) server 502 comprising, in this example, three AI agents 504, 506 and 508, blockchain redaction network 510 comprising a plurality of nodes 512, an "effector", in this example, AI data bridge 514 and credential blockchain network 516. Authentication blockchain network 110 stores credential sessions and executes one or more chaincode instances while credential blockchain network 516 stores credential attributes of the various entities in system 500. Issuer node 102, user device 104, authorization nodes 112, AI agents 504, 506 and 508, storage nodes 120 and AI data bridge 514 may each be referred to herein as a "computing node".

AI server 502 receives interaction requests, typically in the form of AI prompts, from user device 104, or some other entity within system 500, and in response, evaluates each prompt using at least one AI agent, and may provide contextual-based access (i.e., access based on the context of current conditions needed to interact with an entity) to digital resources in system 500 under certain circumstances. In some cases, one AT agent may split a prompt into several sub-tasks (each an AI sub-prompt, for example), and assign other AT agents to process the sub-tasks. Tasks may require a single exchange between user device 104 and one of the AI agents of AI server 502, or a plurality of exchanges requiring one agent to orchestrate a set of interactions between other agents and/or an effector, such as AI data bridge 514. It should be noted that the term "agent", "AI agent", "entity", "provider", and "effector" may be used herein in association with an AI-based entity that can perform complex tasks such as use of an internal machine learning or large language model to perform a requested task, or orchestrate a set of agents and providers to delegate subtasks and coordinate the results back to a requesting entity in a semi- or fully-autonomous fashion. It should be further noted that although AI agents 504, 506 and 508 are shown as all residing at AI server 502, this need not be the case, and one or more of the AI agents 504, 506 and 508, as well as other AT agents, may be located at one or more different AI servers within system 500. Further, it should be understood that in other embodiments, some of the components shown in FIG. 5 may be connected to other components in a different way and that in some embodiments, not all of the components shown in FIG. 5 are needed in order for system 500 to provide autonomous AI agent governance, credential management, and secure inter-agent communications.

When a task is initiated, a prompt may be sent from an initiating entity, such a user of user device 104 (or unilaterally by user device 104) to A server 502, the prompt comprising a query and typically information related to a requested transaction or task. AI server 502 may assign the prompt to one of the AI agents, in this example, AI agent 504. Chaincode on authorization blockchain network 110 may be invoked, either by a user of user device 104 or by agent 504 (a "target" or "provider" entity) to create a "root credential session" comprising a sub-set of the user's credential attributes applicable to a particular organization. For example, a task may comprise determining whether the user has enough in a savings account in a first financial institution to purchase an item costing $200. Based on this task, the chaincode may form a root credential session comprising only user attributes applicable to the first financial institution, and no other user credential attributes assigned to the user applicable to other organizations. The root credential session may then be published on authorization blockchain network 110.

Chaincode operating on authorization blockchain network 110 may then perform a mathematical "intersection" between the user's credential attributes listed in the root credential session with required credential attributes of agent 504 in order to interact with agent 504 to perform the task. It should be understood that in some cases herein, the term "credential attributes" may refer to both a credential attribute type and an associated credential attribute value or it may refer to only a credential attribute type or only to a credential attribute value. Upon intersection, a "credential session" may be created by the chaincode in accordance with a credential session template maintained by the chaincode of authorization blockchain network 110, the credential session comprising a persistent record of common credential attributes of the user and agent 504 and the user's attribute values entitling the user to interact with agent 504 (sometimes referred to herein as a "contextual permission set"). Credential sessions provide persistent authorization context that eliminates the need for credential re-evaluation for each interaction between two entities. The credential session is then published in a cryptographic block on authorization blockchain network 110. Eg., a user U may be a subscriber to two services A and B provided by an organization "orgi", and have access to two databases C and D. The root credential session would list these four credential attributes which may be expressed as "U::org1::A"="subscriber", "U::org1::B"="subscriber", "U::org1::C"="read-only", "U::org1::D"="read-write". Agent 504 may implement service B and requires reading from database D as part of this service, and its credential attributes may be expressed as "U::org1::B"="subscriber", "U::org1::D"="read-only". The intersected credential session governing any interaction between the user and agent 504 would then contain the attributes expressed by the attribute names "U::org1::B" and "U::org1::D".

Credentials, in general, may be implemented as an Attribute-Based Access Control (ABAC) model that enables granular, skill-level controls over agent capabilities. Unlike traditional role-based access control, ABAC evaluates multiple attributes simultaneously, enabling fine-grained authorization decisions based on provider, skill, scope, and contextual factors. In one embodiment, each credential comprises multiple attributes with the following schema:

```
type AresCredAttribute struct {
    ProviderId string // Unique identifier (i.e., UUID) of an agent
    SkillId string // Individual API capability identifier
    Name string // Attribute name
    Scope string // Validity constraint
    Value string // Attribute value
}
```

Key features of this the credential model comprise: (i) Provider Binding: Each attribute is bound to a specific service provider via ProviderId; (ii) Skill Granularity: Individual capabilities (A2A skills, MCP tools) are identified by SkillId; (iii) Scoped Values: The Scope field constrains attribute validity (e.g., "sales_department", "project alpha"), and (iv) Flexible Expression: Name-value pairs support diverse authorization scenarios.

Example credential attributes constitute: "role=user"—global user role, "role::sales_department=manager"—scoped manager role, "data_access::customer_db=read"-read-only database access, "skill::invoice_generation=execute"—specific skill permission.

In one embodiment, each credential session may comprise one or more of the following:

```
type AresCredSession struct {
    SessionId string // Unique session identifier
    OwnerId string // Credential holder
    OtherParty string // Service provider
    OwnerFilterPolicyId string // Owner's content filter
    OtherPartyFilterPolicyId string // Provider's content
        filter
    ContextLib map[string]string // Context pointers/URLs
    Scopes [ ]string // Authorized scopes
    CredAttributes [ ]AresCredAttribute // Listing of veri-
        fied attributes
}
```

Once a credential session has been created and published on authorization blockchain network 110 in association with two entities, each entity may evaluate the credential session to determine conditions and permissions needed in order to interact with agent 504. When agent 504 has processed the prompt, the task is complete and a result is provided to the requesting entity. The result may be a digital resource within system 500, an answer to a query, an analysis of a problem set provided by a requesting entity, access to an API, access to a service, access to software tools, etc.

Tasks may be divided into sub-tasks by AI agent 504 acting as a "manager" agent, assigning one or more sub-tasks to one or more other, AI agents. In order to identify potential sub-agents to help process a task, a manager agent may submit a request to authorization blockchain network 110 for the chaincode to generate other credential sessions between agent 504 and other potential agents/evaluators, respectively and/or between other agents. Each additional credential session comprises an intersection of the credential attributes listed in the credential session associated with agent 504 as a provider (the "504-session"), and the required credential attribute types of each target agent/evaluator agent 504 is planning to interact with as a requestor. When at least one credential attribute listed in the 504-session intersects with the credential attributes of a sub-agent that 504 wants to interact with, an additional credential session, representing agent 504 as the requestor and the particular sub-agent as the provider, may be generated. The managing AI agent 504 may then evaluate the resulting credential session(s) to decide on the best course of action, i.e., which sub-agents to use and which sub-tasks should be managed by each chosen sub-agent. In another embodiment, a credential session may be published whether or not any credential attributes match between an initiator and a provider.

For example, a traffic-based point-of-interest navigation application being executed on user device 104 may utilize agent 504 to identify the name and location of several points of interest provided by a user of device 104 (such as particular "store types", i.e., "gas stations", "pharmacies", "parks", etc., explicit store names ("Macys")) and their locations, etc. ("POI discovery"). In this example, a credential attribute of agent 504 may comprise an attribute type of "capability" with an attribute value of "point-of-interest (POI) discovery" to signify that agent 504 is capable of identifying particular points of interest submitted by a user and determine their locations. A capability of an agent may be referred to herein as a "skill". A credential attribute of agent 506 may comprise two "capability" attribute types, one identifying a navigation and routing capability and another identifying a real-time traffic information capability (in some cases, using AI data bridge 514). In this example, conditions required for interacting with agent 504 may comprise that the user must be a subscriber to three services—POI discovery, navigation and routing, and traffic. Agent 504 may cause chaincode on authorization blockchain network 110 to determine whether the requesting user's sub-set of credential attributes listed in the user's root credential session "intersects" with the respective credential attributes of agents 504, 506 and AI data bridge 514 needed to perform all sub-tasks of the task (i.e., POI discovery, navigation and routing, and traffic). In this example, the authorization blockchain chaincode may evaluate whether the user is an active subscriber of a POI discovery service managed by agent 504, an active subscriber of a navigation and routing service managed by agent 506 and an active subscriber to a real-time traffic service provided by AI data bridge 514. To perform this evaluation, the chaincode first intersects the credential attributes from the root credential session with the credential attributes of agent 504 to create and publish on the authorization blockchain network 110 a credential session pertaining to agent 504 as the provider. The intersected attributes listed in this session are then evaluated by value to establish whether the user is allowed to use these skills from agent 504. After successful evaluation of the credential session, agent 504 may invoke the chaincode to perform the POI discovery function while delegating the navigation and routing function to agent 506 and the traffic function to AI data bridge 514 (where AI data bridge 514 is connected to a real-time traffic information service (not shown) via wide-area network 122).

If the traffic-based POI navigation application additionally comprises a capability of identifying a cheapest ride share or taxi service and booking a vehicle ("rideshare" service), and the user has a credential attribute value of "subscriber" for all four of these services (i.e., attribute types) (POI, navigation and routing, traffic, and rideshare), and agent 504 can provide the skills or delegate such task to sub-agents to interact with the navigation, traffic and routing, traffic and rideshare services, and further that agent 504 has a skill to process prompts for requesting traffic-based point-of-interest navigation, then a credential session may be generated between the user and agent 504 comprising the "intersection" (i.e., set of credential attribute types that are common to both the user's credential attribute types and agent 504's credential attribute types) of user credential attributes types listed in a root credential session of the user and a required credential attribute types of agent 504 (i.e., condition types required to interact with agent 504). For example, the credential session between the user and agent 504 may comprise credential types of ["POI", "navigation", "traffic", "rideshare" ]. The chaincode may additionally determine whether the user is authorized to use the navigation and routing function of agent 506 by evaluating required credential attribute types of agent 506 (i.e., conditions needed for user to use the navigation and routing function) against the credential session created between the user and agent 504. If so, another credential session may be created and published on authorization blockchain network 110, comprising the intersection of the first credential session previously created and the required credential attribute types of agent 506, i.e., credential types of ["navigation", "traffic", "rideshare" ]. Similarly, the chaincode may additionally determine whether the user is authorized to use the traffic function of AI data bridge 514 by evaluating required credential attribute types of AI data bridge 514 (i.e., conditions needed for user to use the traffic function) against the credential session created between agent 504 and agent 506. If so, another credential session may be created and published on authorization blockchain network 110, comprising the intersection of the second credential session between agent 504 and agent 506 with the required credential attribute types of AI data bridge 514, i.e., credential types oof [traffic", "rideshare" ]. Finally, the chaincode may additionally determine whether the user is authorized to use the rideshare function by evaluating required credential attribute types of the agent responsible for providing rideshare services (not shown) (i.e., conditions needed for user to use the rideshare function) against the credential session created between the agent 506 and AI data bridge 514. If so, yet another credential session may be created and published on authorization blockchain network 110, comprising the intersection of the third credential session between agent 506 and AI data bridge 514 with the required credential attribute types of the rideshare agent, i.e., ["rideshare" ].

Each credential session typically pertains to only two entities, a requesting entity and a provider entity. Based on the user's credential attributes published in the root credential session, subsequent chained sessions with sub-agents ensure that (i) any sub-interaction is within the constraints of the original user's credential attributes, and (ii) are performed under the governance of the credential attributes assigned to the two interacting entities. E.g. a user in organization A sends a request to an agent A1 in organization A, which in turn relies on a sub-task performed by an agent B1 in organization B. The initial intersection ("chain") of the user's root credential session with agent A1's credential attributes generate credential session SA1 which holds only the attributes relevant to the interaction between the user and A1. When A1 determines that it needs a sub-task to be performed by (i.e. delegated to) agent B1 it performs a further intersection of SA1 with B1's credential attributes to create session SB1. SB1 may include credential attributes relevant to the cross-organizational exchange between A1 and B1 in the context of the user's credential attributes listed in SAL. E.g. if the user has full direct access to agent B1's skills, but agent A1 only has access to specific skills, or has a rate-limit on exercising B1's skills, the intersected attributes in SB1 do not only include the user's access to B1 skills, but also the additional constraints of A1 accessing B1's skills. As sub-tasks are delegated along the chain of execution and a provider acts as a requestor, each subsequent associated credential session may comprise an intersection of the provider's session to maintain the authorization context delegated along the chain. This concept of "chaining" is a technical advantage over comparing the user's root credential with each sub-agent's credential attributes because each, further credential session comprises not only the credential attributes of the initiator, i.e., the user, but also the credential attributes of any successor agent. This means that all conditions and permissions of any delegating agent in a chain of agents will be observed by the lower-most agent.

In some embodiments, agent 504 may solely orchestrate other agents, providers or effectors, and not perform any sub-tasks itself. Such a coordinating agent may be issued a wildcard credential such that the intersection of the root credential session with this agent 504 may inherit all credential attributes present in the user's root credential session. Inheriting all credential attributes via intersecting with a wildcard allows the coordinating agent 504 to delegate any required user credential attributes to any sub-agent performing a sub-task without prior knowledge of all possible coordination workflows of other sub-agents. The wildcard credential may include an additional scope, e.g. the agent 504's credential session may inherit all user credential attributes pertaining to a specific organization or group within an organization.

Once a credential session has been created and published on authorization blockchain network 110, each of the two participants of that sub-interaction use the evaluated conditions and permissions published in the credential session to perform a particular sub-task associated with a prompt received from the user by agent 504. When each of the subtasks have been completed by each of the sub-agents, a result of the task may be provided by agent 504 to the requesting entity. The result may be a digital resource within system 500, an answer to a query, an analysis of a problem set provided by a requesting entity, access to an API, access to a service, access to software tools etc.

Figure 6:
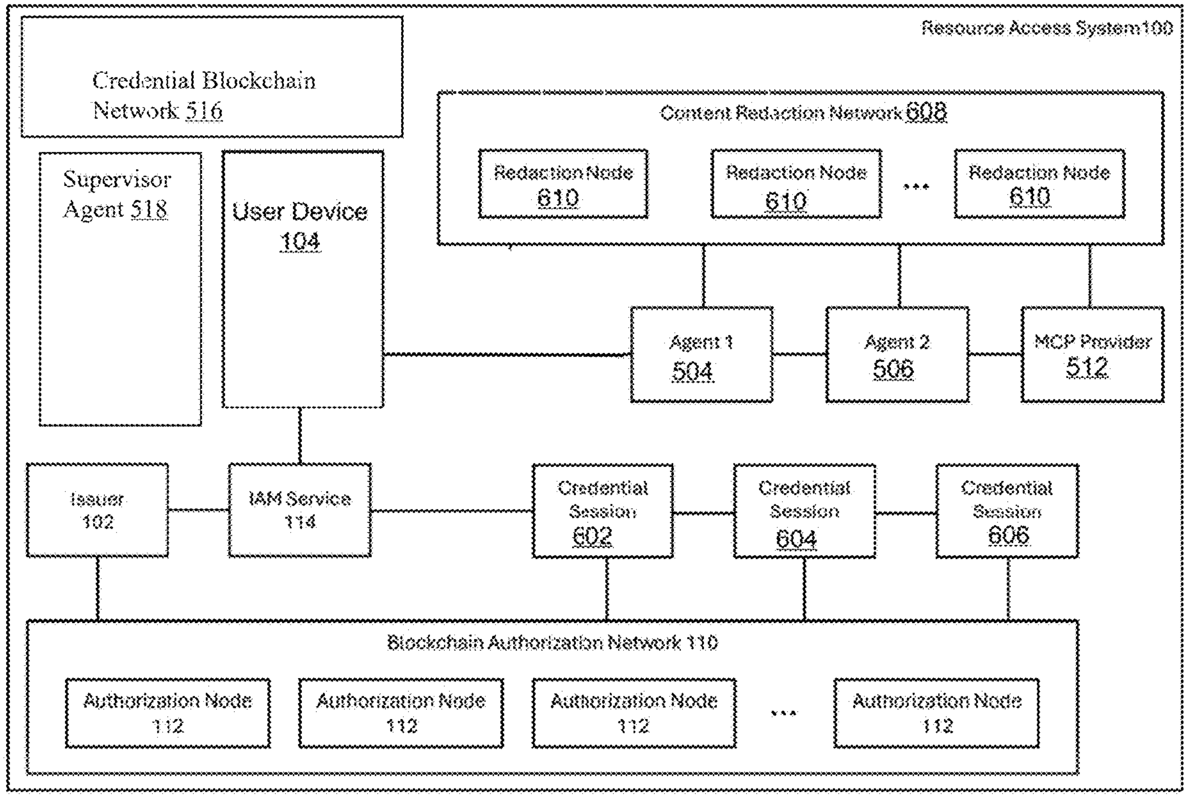
FIG. 6 is a conceptualized block diagram of the system as shown in FIG. 5, illustrating how tasks are managed.

FIG. 6 is a conceptualized block diagram of system 500 that illustrates how tasks are managed, and will be discussed in detail with reference to the method steps described below in association with FIG. 8. Generally, when a task is initiated by a user via an application being executed on user device 104, authorization blockchain network 110 executes chaincode to generate a root credential session (not shown) comprising a sub-set of all credential attributes assigned to the user by issuer 102 within the scope of one or more particular organizations, and the root credential session then may be published on authorization blockchain network 110. Chaincode operating on authorization blockchain network 110 may then intersect required credential attribute types of a target entity, i.e., agent 504, with the sub-set of the user's credential attributes in the root credential session and create a credential session 602, listing the intersected credential attributes required by agent 504 and the corresponding credential values associated with the user in order to evaluate at a further point in time whether the values suffice authorization to interact with agent 504. Credential session 602 may then be published on authorization blockchain network 110 in the form of a "credential session cryptographic block" memorializing the credential session, which is uniquely associated with the user and agent 504. For interactions between agent 504 and agent 506, credential session 604 may be generated based on an intersection between the credential attributes listed in credential session 602 against the required credential attribute types of agent 506 in order for agent 504 to interact with agent 506. Similarly, for an interaction between agent 506 and AI data bridge 514, a credential session 606 may be generated and published on authorization blockchain network 110 based on an intersection of the credential attributes listed in credential session 604 against required credential attribute types of AI data bridge 514 in order for agent 506 to interact with AI data bridge 514.

Figure 7:
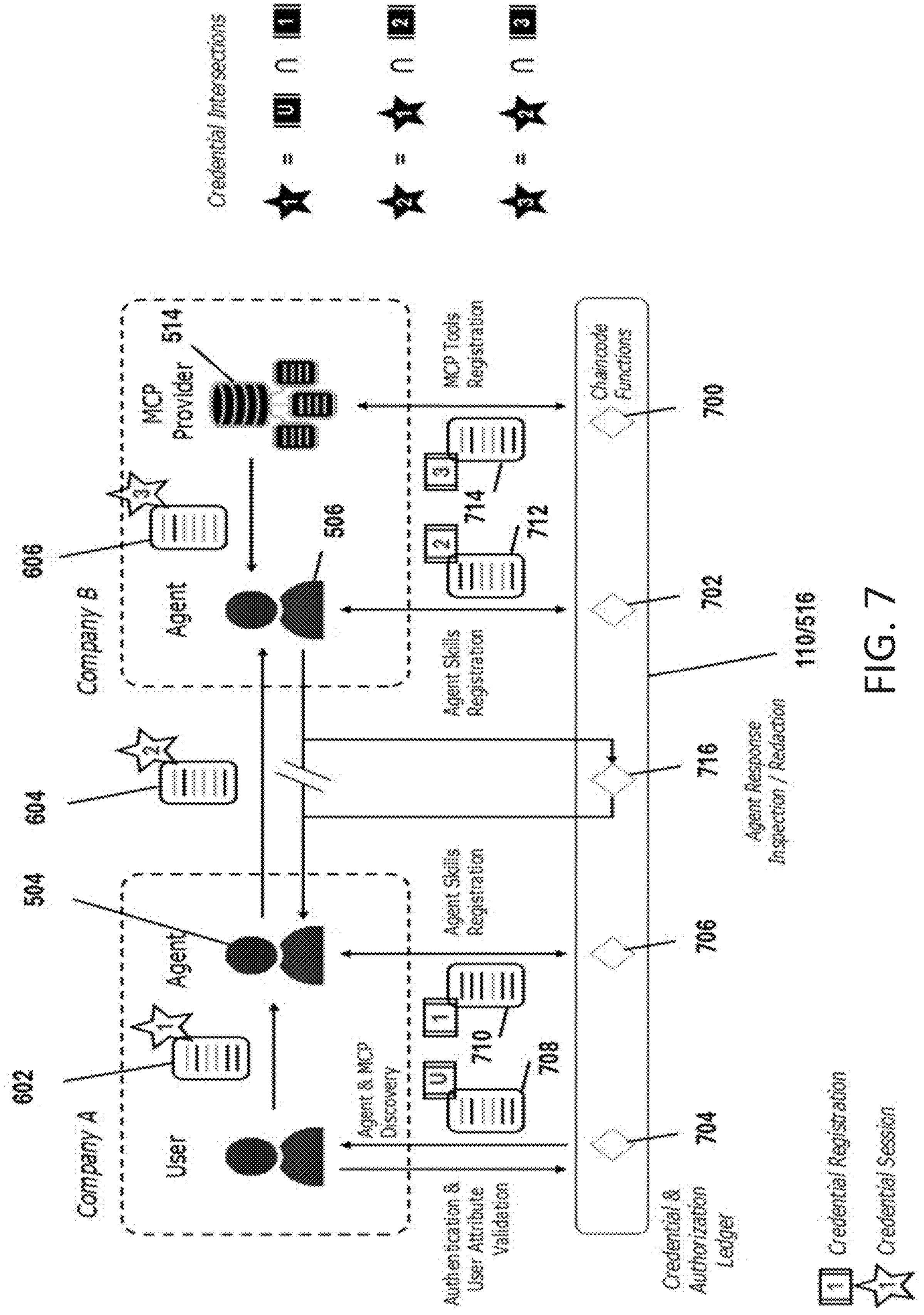
FIG. 7 is another functional block diagram, illustrating how AI agent governance, credential management, and secure inter-agent communications are performed.

FIG. 7 is another functional block diagram, illustrating how AI agent governance, credential management, and secure inter-agent communications are performed. Issuing entity 102 may assign credential attributes, including a credential type and credential value, to each entity in system 500 in the form of a "credential". Each credential may comprise a variety of credential attributes and associated values and, further, the credential attributes may each be associated with an organization (or some other entity), a particular task, etc. For example, a user of user device 104 may be assigned a credential comprising a first credential attribute of "account checking balance" with a, associated value of $100 and associated with a first commercial bank and a second credential attribute "credit card limit" with an associated value of $5,000 and associated with a second commercial bank.

A task may be initiated by a user operating user device 104 executing an application associated with the task. When the user initiates the task, the user may send a message, such as an AI prompt, to chaincode 704 on credential blockchain network 516, with information to authenticate the user using traditional techniques or, in one embodiment, by retrieving user attributes from an account on IAM server 114 and/or attributes from a user attributes object stored on credential blockchain network 110. The message may additionally request that chaincode 704 create a root credential session 708 comprising a sub-set of the user's complete credential attributes assigned by issuing entity 102 in accordance with one or more policies of one or more organizations associated with the user. The result is a root credential session 708 containing a sub-set of the user's full credential attributes pertaining to the one or more organizations. Root credential session 708 is then stored on authorization blockchain network 110.

Chaincode 704 operating on credential blockchain network 516 (or some other chaincode operating on credential blockchain network 516), may generate credential 710 comprising a listing of credential attributes of agent 504, such as a listing of capabilities, skills, conditions and or permissions needed in order to interact with agent 504. Credential 710 may be created at any time, including prior to, or during, execution of a task. Credential 710 may then be stored on authorization blockchain network 110.

Chaincode 702, operating on authorization blockchain network 110, may perform an intersection between the sub-set of the user's credential attributes in root credential session 708 to the credential attributes required in order to access agent 504 listed in credential 710 and formulate the resulting intersected credential session 602 based on the credential session template. Credential session 602 may then be published on authorization blockchain network 110, listing the intersected credential attributes and attribute values of the user.

Chaincode 700, (or some other chaincode operating on authorization blockchain network 110), at some later time, may execute a credential session evaluation process for determining whether the user's credential attribute values listed in credential session 602 satisfy the requirements of agent 504 in order to interact with agent 504.

AI server 502, or agent 504, may determine that the requested task is best processed by splitting the task into sub-tasks and using a delegate agent and an AI data bridge to perform one of the sub-tasks, respectively. Agent 504 may send a message to chaincode 704 (or some other chaincode operating on credential blockchain network 516), to determine whether a particular delegate agent and AI data bridge is available to process the sub-tasks (i.e. credentialed within the organization to perform the required skills). In this example chaincode 704 identifies agent 506 as applicable. Then agent 504 uses chaincode 702 to create credential session 604, listing an intersection of the credential attributes listed in credential session 602 and the required credential attribute types required by agent 506 in order for agent 504 to interact with agent 506.

Agent 506 may also send a message to chaincode 704 to determine a particular AI data bridge to process one of the sub-tasks. Once chaincode 704 identified AI data bridge 514 as applicable (i.e. credentialed within the organization to perform the required skills), agent 506 uses chaincode 702 to create credential session 606, listing an intersection of the credential attributes listed in credential session 604 and the required credential attribute types required by AI data bridge 514 in order for agent 506 to interact with AI data bridge 514.

The task may now be performed. Agent 504 may send a request to chaincode 700 to evaluate the user's current credential attribute values associated with the required credential attribute values as listed in credential session 602. When the user's current credential attribute values satisfy the required credential attributes as listed in credential session 602, chaincode 700 notifies agent 504 that the user is authorized to interact with agent 504. Then, agent 504 may determine the names and locations of points of interest identified by the user. Similar operations are performed to verify that the user is authorized to interact with agent 506 in order to determine a best route for the user to take in order to visit each of the points of interest and AI data bridge 514 for providing real-time traffic data AI data bridge 514 to agent 506.

It should be noted that the creation of credential sessions along the delegated chain of sub-task execution may be performed upfront to guarantee all sub-tasks are permitted in the context of the user and the involved agents and AI data bridges. However, the first sub-task may commence as soon as credential session 602 is evaluated as sufficient to authorize a sub-task, and further credential sessions 604 and 606 are created and evaluated as the interactions between 504 and 506, and 506 and 514, respectively, are determined to be necessary to execute the task. In this latter case, sub-tasks may dynamically be assigned to sub-agents or sub-effectors as best suited for task execution, and may cause the overall task initiated by the user to fail should any sub-task not be permitted. Furthermore, agent 504 or 506 may determine upon non-authorization of an intended sub-task to query chaincode 700 to determine other alternative providers that may be authorized for use within the context of the user's task and associated credential attributes.

In some embodiments, access to resource, such as agent, process, service, software tools, may be partially restricted by the use of filters to limit information or services for interactions between two agents or other entities of system 500. For example, after credential session 604 has been created, agent 504, operating under organizational rules of company A may interact with agent 506 operating under organizational rules of company B. A filter may be implemented as chaincode 700 operating on blockchain network 110 or some other blockchain, such as blockchain redaction network 510, that filters interactions between agent 504 and agent 506 by content type, metadata, actual content, services, etc. as further described below. Content filters may be applied to any data exchanged as part of an interaction, e.g. a prompt sent from agent 504 to agent 506 across a trust boundary 718, a context provided with a prompt to agent 506, or a response supplied by agent 506 to agent 504. Further discussion of filters is provided later herein.

Each of the nodes of system 500 generally comprise the components of system 100 as shown in FIG. 2 herein, such as processor 200, memory 202, communication interface 204 and in some cases, user interface 206. Different entity types may be loaded with different executable instructions in order for each node to perform its intended functions.

Figure 8A:
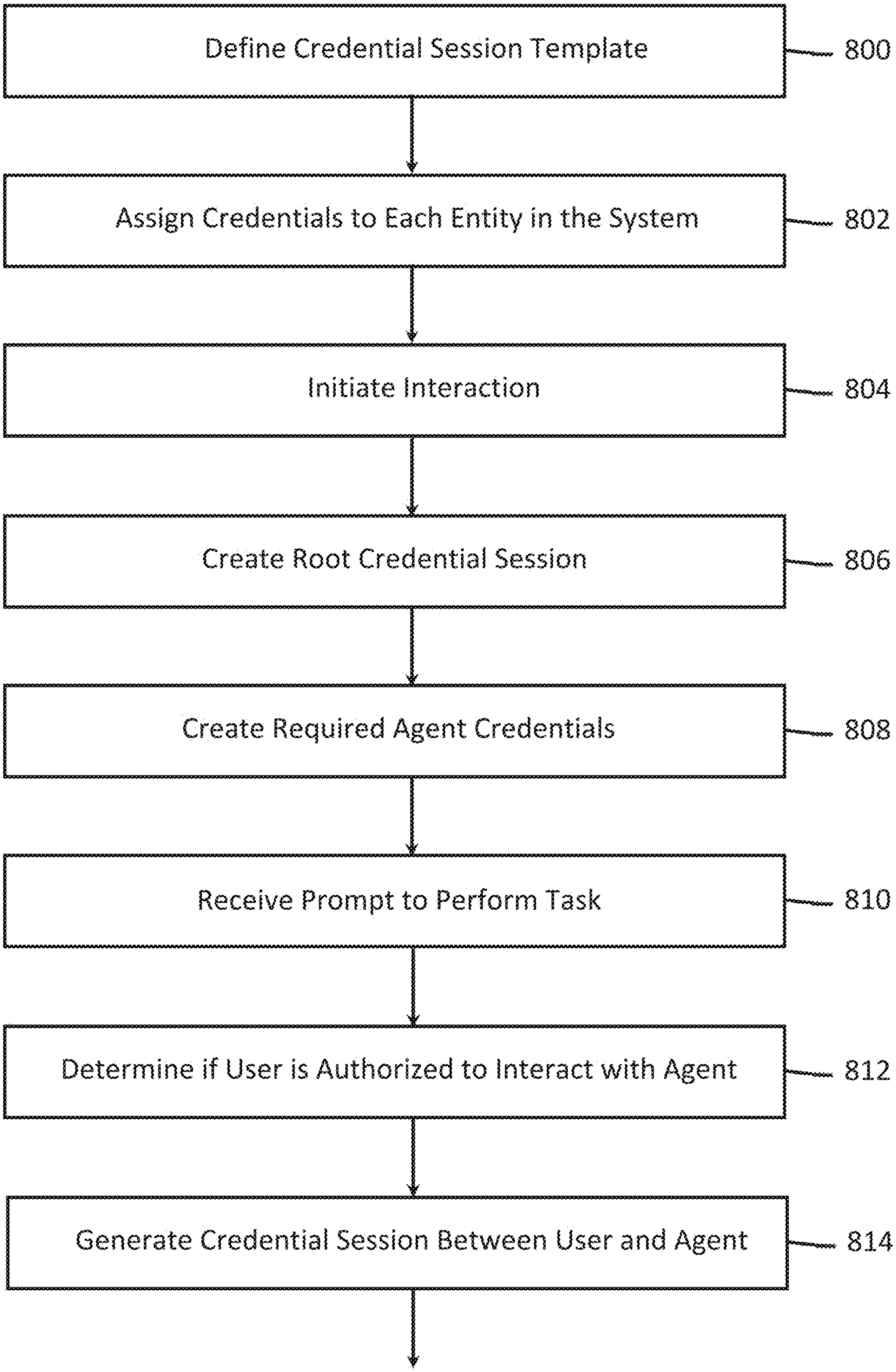
FIGS. 8A-8C is a flow diagram illustrating a method for providing autonomous AI agent governance, credential management, and secure inter-agent communications.
Figure 8B:
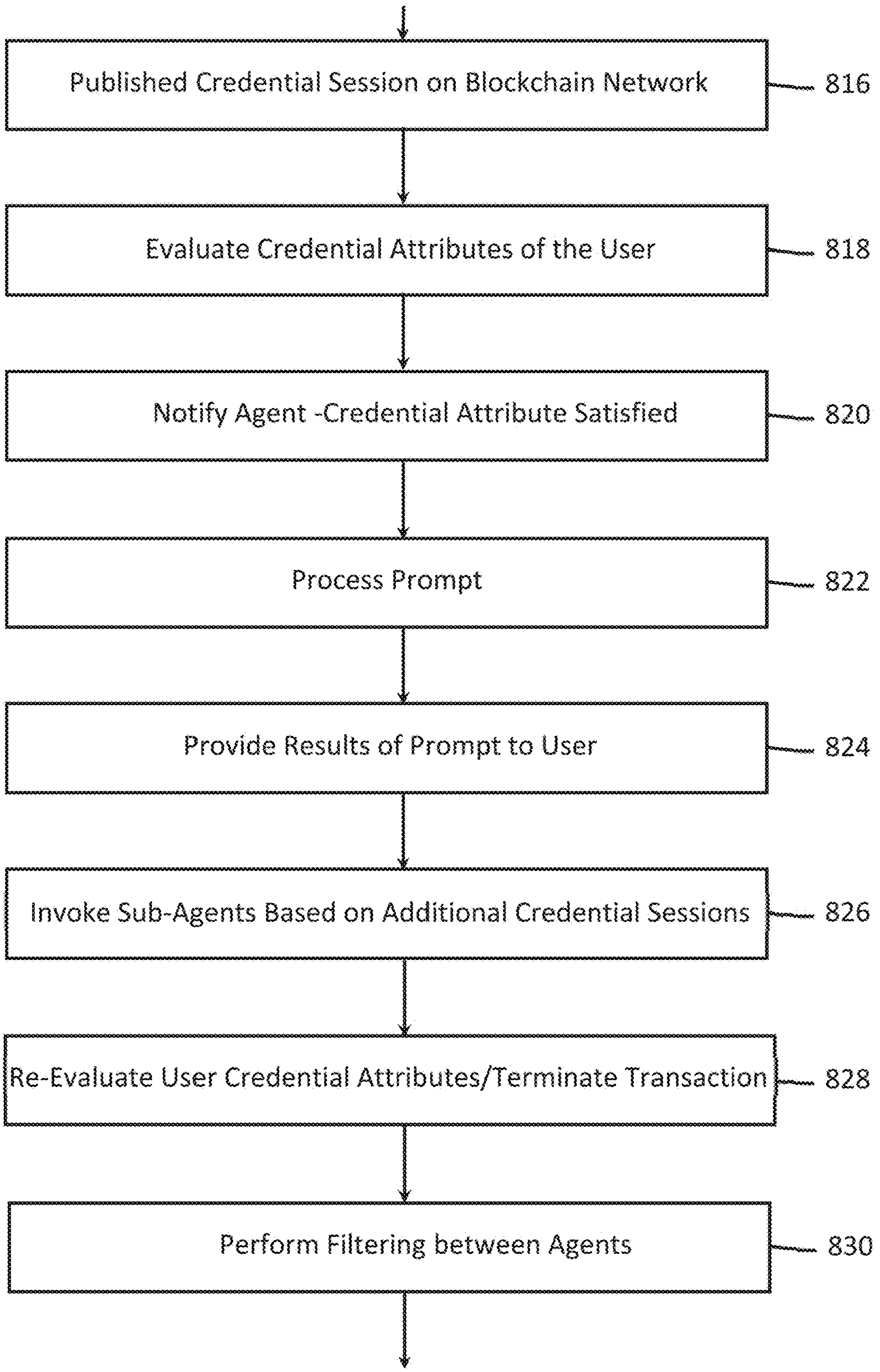
Figure 8C:
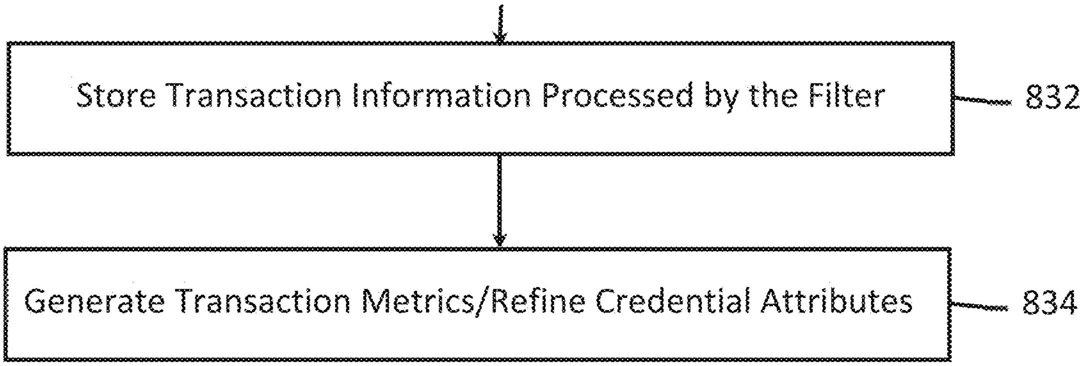

FIG. 8 is a functional block diagram illustrating one embodiment of a method for providing autonomous AI agent governance, credential management, and secure inter-agent communications. More specifically, the method describes operations performed by processor 200 of the entities of system 500, each executing respective processor-executable instructions stored in a respective memory 202, even though processor 200, memory 202 and communication interface 204 may not be explicitly mentioned. It should be understood that in some embodiments, not all of the steps shown in FIG. 8 are performed, and that the order in which the steps are carried out may be different in other embodiments. It should be further understood that some minor method steps have been omitted for purposes of clarity.

At step 800, issuer entity 102 may define a "credential session template" used by chaincode 702 to create credential sessions. The credential session template comprises a schema listing a number of credential attributes as name-value pairs pertinent to interactions between any two entities of system 500. In some embodiments, the credential session template may be generated from a previously-created attribute template associated with a particular agent, provider, or interaction type, and may also be generated from information an agent or provider may attest to when published. E.g., an Agent Card as specified in the A2A protocol may contain security attributes for an agent's skills/capabilities that allow expression in the form of credential attributes. The credential session template may be auto-generated from a set of required skills by collecting all pertinent agents' security attributes and expressing them in the form of credential attributes.

At step 802, the issuing entity may create a plurality of credentials, one for each entity in system 500. As explained earlier herein, each credential comprises a listing of credential attributes associated with each entity and, in some embodiments, each credential attribute associated with a particular organization, task, or some other construct. Each of the plurality of credentials are published on credential blockchain network 516.

At step 804, a user may initiate a desired task or interaction via user device 104 using an application executed by user device 104. As mentioned above, each interaction between an initiator entity (i.e., the user/user device 104 in this example) and a target entity (i.e., agent 504 in this example) may comprise one or multiple exchanges of agent prompts, contexts, and responses, data provider lookups or updates, real-world effector control commands, a variety of network-accessible clear or encrypted digital files, remote software applications, clear or encrypted digital information streams, clear or encrypted digital control streams, etc. In this example, the application being executed on user device 104 may comprise a traffic-optimized routing application for creating driving directions from a user's current location to a desired set of locations, or points of interest, (e.g. a set of stores), based on current traffic conditions. This application may provide an interactive, language-based interface on user device 104. As a specific example, the user may prompt the application to "find a nearby grocery store and a bakery, and provide me with directions that optimize the order of stops based on current traffic conditions" to initiate an interaction. This prompt may then be sent by user device 104 to agent 504 of AI server 502 via a wide-area network 122 to initiate the task.

At step 806, in one embodiment, the user may send a command to chaincode 704 on authorization blockchain network 110 for the chaincode to create a root credential session 708 for based on the policies of one or more organizations identified by the user. Root credential session 708 comprises a sub-set of all of the user's credential attributes assigned by issuing entity 102 and applicable to a particular policy, organization, task, or some other construct. Root credential session 708 may then be published on authorization blockchain network 110. In some embodiments, one or more credential attributes in root credential session 708 may comprise a pointer, link, or some other object for retrieval of attribute values that may change over time.

At step 808, chaincode 704 may create one or a plurality of credentials 710, each credential 710 credential attributes associated with each agent, sub-agent, provider and effector, such as a requirement that a requesting user subscribe to a point-of-interest (POI) location service for identifying the location of various points of interest (i.e., a grocery store and a bakery near the current location of the user), a traffic service for providing current traffic conditions and a routing service for creating an optimized route, based on the current traffic conditions, between the user's current location and the POI locations identified in the request.

At step 810, the user may prompt agent 504 with a request to perform functions required to perform a traffic-optimized routing application, the necessary data to perform the functions, including one or more current credential attribute values associated with the user with respect to the traffic-optimized routing application. For example, in this case, the user may provide the user's current location, a listing of stored types near the user's location where the user wishes to be routed and indications that the user is currently a member of the point-of-interest (POI) location service, a routing service and a traffic service.

At step 812, agent 504 may determine whether the user is authorized to interact with agent 504 by sending a command to chaincode 704 to generate a credential session between the user and agent 504.

At step 814, chaincode 702 performs an intersection of credential attributes between the user's sub-set of credential attributes in route credential session 708 with the credential attributes of agent 504 in credential 710. The intersection determines common credential attributes between the user and agent 504, including verified attribute values assigned to the user in order to establish the user's entitlement to interact with agent 504 in future interactions. Thus, credential attribute 602 is created, listing the common credential attributes of the user and agent 504 along with credential values of the user in association with the common credential attributes.

At step 816, chaincode 702 may publish credential session 602 on authorization blockchain network 110 for future interactions between the user and agent 504 in the context of the future interactions. Chaincode 702 may also publish a credential session when none of the credential attributes of the user and agent 504 match, for memorializing failed attempts to interact with agent 504. Credential session 602 comprises a listing identifying the user, agent 504 and the intersected credential attributes between the user and agent 504, which defines the particular credential attributes and attribute values needed in order for the user to interact with agent 504. Chaincode 702 may then provide an identification of a cryptographic block on authorization blockchain network 110 containing credential session 602 to agent 504 and to the user.

At step 818, chaincode 700 evaluates the user's current credential attribute values listed in credential session 602 against the required credential attributes of agent 504, in some embodiments, as listed in credential 710. The user's current credential attributes may be provided to chaincode 700 by agent 504 from the prompt provided to agent 504 from the user, and/or stored in credential session 602 for verified values that may be unchanged over time and/or, in some embodiments, chain code 700 may retrieve a user's current credential attribute values from another source, such as IAM server 114, credential blockchain network 516 (i.e., retrieving a custom user attribute object), from a web service identified by a URL in credential session 604, etc. Credential attributes may be organized by organization, name, and scope, and any other properties that associate an attribute type with a potential interaction in a meaningful way to determine its applicability. e.g., blockchain network 516 may collect all attribute names and scopes referred to in the required credential attributes of agent 504. This evaluation may be based on matching strings, determining matching prefixes or suffixes, confirming a subset of a set of strings or values, a mathematical relationship between values, and similar comparison methodologies known in the art to express access rules.

For example, if a user is interacting with agent 504 coordinating ride share services, required credential attributes of agent 504 may require the user to be a valid subscriber of a ride share service and have a valid payment instrument configured. This may be expressed as two credential attributes—a "subscriber-status" with possible values ["unknown", "active", "terminated" ], and a "payment-method" attribute, with possible values ["prepaid", "postpaid" ]. A possible valid set of credential attributes would be "subscriber-status=valid AND payment-method=postpaid" with valid billing information as part of the "payment-method" credential attribute.

At step 820, if at least one of the credential attribute values of the user satisfies the required credential attributes of agent 504 as listed in credential session 602, chaincode 700 notifies agent 504 and, in some embodiments, an identification of the credential attribute(s) that were satisfied and, in some embodiments, actual credential attribute values of the user.

At step 822, in response to receiving the notification from chaincode 700, agent 504 processes the prompt provided by the user to obtain traffic-based POI navigation instructions for the user. In one embodiment, agent 504 possesses all of the skills necessary to process the prompt, such as to determine the identity and locations of points of interest identified in the prompt, to retrieve real-time traffic information and to generate a route and navigation instructions.

At step 824, agent 504 may provide the route and navigation instructions to the user.

At step 826, in some embodiments where agent 504 does not possess all of the skills necessary to process a prompt, agent 504 may divide a task into a number of sub-tasks and determine an optimum delegation of the sub-tasks to other agents or providers depending on its own capabilities, the user's credential attributes, capabilities of other agents, and other operational attributes, e.g. selecting a low-cost versus fast turnaround agent as a delegate agent for a specific sub-task. In order to identify potential participant agents for an interaction, agent 504 may request chaincode 704 on authorization blockchain network 110 to generate additional credential sessions, each associated with interactions between a pair of agents and/or effectors that may be capable of performing the sub-tasks. In this example, chaincode 704 identifies agent 506 and AT data bridge 514 as potential entities able to perform the sub-tasks. In response, chaincode 704 may cause an intersection of credential attributes between credential session 602 and agent 506, and another intersection of credential attributes between agent 506 and AT data bridge 514, respectively. If at least one of the user's credential attribute types intersects with the required credential attributes of agent 506 or AI data bridge 514, respectively, credential sessions 604 and 606 may be created and published, respectively, in credential session blocks, respectively, on authorization blockchain network 110. Agent 504 may then evaluate credential sessions 604 and 606 to decide on the best course of action, i.e., whether to use agent 506 and/or AI data bridge 514 to manage one or more sub-tasks.

In one embodiment, a credential session created between agent 504 and delegate agent 506 may be generated by intersecting credential session 602 with attributes of agent 506. As agent 504 is acting on behalf of an interaction initiator (i.e., the user), agent 504's possible interactions with e.g. agent 506 may be evaluated in the context of the user's credential attributes. As credential session 602 is already a collection of agent 504's applicable skills and constraints in the context of the user's credential attributes, the intersect between credential session 602 and agent 506's credential attributes inherits this context, and thus produces credential session 604, collecting all pertinent skills of agents 504 and 506 in the context of the user attributes validated and pertinent to the requested interaction. The attribute intersect is performed based on matching concepts such as identifying attributes by e.g. name and scope, and filtering out attributes with such match and values allowing for the associated agent skill to be utilized in the context of an interaction. This concept is also described with respect to FIGS. 6 and 7.

In general, for any participant A in an interaction, there is one credential session generated in association with another participant B that A interacts with A. Note that based on the similarity of agent and provider capabilities, network 110 may publish credential sessions that are applicable to a subgroup of participants in an interaction, or even a single credential session for all participants. Once a credential session has been published on authorization blockchain 110, each of the two participants (i.e., initiator entity and target entity) of a sub-interaction may use the evaluated conditions and permissions published in the credential session to perform their internal access control specific to the particular interaction requested. E.g. if a credential session lists 2 out of 4 possible skills of a provider, then the provider may decline any requests received under the governance of this credential session for any of the other two unlisted skills.

At step 828, an agent or provider 504, 506, 514 involved in an interaction, or chaincode 700, may continue to determine whether at least one of the credential attributes specified in a particular credential session continue to satisfy at least one of the credential attributes of the provider entity on an ongoing-basis. For example, an updated credential attribute value of the user may change over time, after credential session 602 has been published. In this case, the updated credential attribute value may be provided in a prompt to agent 504, and agent 504 passes the updated credential attribute value to chaincode 700 on authorization blockchain network 110 for chaincode 700 to evaluate the updated credential attribute value against agent 504's credential attributes. If none of the user's current credential attribute values now satisfy the credential attributes of agent 504, chaincode 700 may notify agent 504 and/or cause another cryptographic block to be published on authorization blockchain network 110, indicating that credential session 602 is no longer valid. As a result, any current interactions between the user and agent 504 may be terminated and any future attempts to interact with agent 504 by the user may be denied. In one embodiment, when a credential attribute value of the user changes, but at least one of the user's credential attribute values continue to satisfy at least one of the credential attributes of agent 504, chaincode 700 may cause publication of a new credential session on authorization blockchain network 110 comprising the updated credential attribute value and any other credential attributes that did not change.

Similarly, in another embodiment alternatively or in addition to the above, chaincode 700 may reevaluate access to agent 504 when one of agent 504's credential attributes changes. In this embodiment, chaincode 700 may receive a notification from agent 504 that 1 of agent 504's credential attributes have changed, and a credential attribute value associated with the changed credential attribute, and chaincode 700 performs an evaluation of credential session 602 in order to determine whether the credential attribute values of the user continue to meet at least one of the credential attributes of agent 504.

Further, in another embodiment alternatively or in addition to the above, chaincode 700 may reevaluate access to agent 504 when a user attribute value in credential session 602 represents a reference to a source for a dynamic attribute value, such as a URL of a web service, a programmatic API, a file or database reference or the like. The reference may include information as to whether the attribute value is to be verified for each access to agent 504, is valid for a specific period of times or number of accesses, or similar constraints for a periodic refresh of the dynamic user attribute value.

At step 830, in some embodiments, chaincode 716 on authorization blockchain network 110, or other chaincode operating on a separate blockchain redaction network 510, may be employed to perform near real-time content inspection and redaction (i.e., "filtering") as a consensus-based operation to provide protection against manipulation of data and cyber-attacks. Generally, content filters may be defined and used between any two entities participating in an interaction. Chaincode 716 may function to filter the data by content type, metadata, or actual content as further described below. Filters may be applied to any data exchanged as part of an interaction, e.g. a prompt sent from agent 504 to agent 506 across trust boundary 718, a context provided with a prompt to agent 506, or a response supplied by agent 506 to agent 504. Similarly, filters may be applied to queries and responses exchanged between agents and providers, e.g. data exchanged with a data source or commands sent to an effector provider. Network 510 (or, alternatively, network 110) may be integrated into the data flow (i.e., exchange of data between/among entities) as a pass-through entity, e.g. a response from agent 506 to 504 may be sent from agent 506 to network 510, and then upon inspection by chaincode 716, forwarded by chaincode 716 to agent 504. Alternatively, agent 506 may send the response to agent 504 and network 510 in parallel; agent 504 may then perform internal tasks such as further reasoning until chaincode 716 confirms that the response is authorized in accordance with a filter executed by chaincode 716. In case of network 510 identifying invalid data in 506's response, i.e., data that violates a filter executed by chaincode 716, chaincode 716 may notify agent 504 of the violation, and agent 504 may, in response, terminate a sub-task involving this response from agent 506 and delete the data from its context. The pass-through approach may be the most effective as a true zero-trust deployment, whereby no data can be exchanged without inspection and/or redaction. The parallel processing approach can improve system performance in deployments where full zero-trust at the data level is not necessarily required due to other effective remedies, e.g. legal actions or commercial incentives between companies interacting across trust boundary 718.

At step 832, chaincode 716 may memorialize some or all of the data passing through each filter function, such as only important keywords, redacted sections, a summary of the information, or the complete data set for later-on analysis of the effectiveness of the credential attributes originally applied to define the permissible exchanges as part of any interaction. The data may be stored in one or more cryptographic blocks in authorization blockchain network 110, some other blockchain network such distributed storage network 118, or even in a traditional data repository.

Chaincode 716 may include filter definitions for allowing only permissible content to be exchanged between users/agents/providers. A content filter may limit the type of content, select a subset of content based on its metadata, select a subset of content based on the content itself, or any combination thereof. When data is exchanged across trust boundary 718 (e.g., between departments, companies, countries, military branches, or between two entities having disparate permissions, controls, policies, etc.), an applicable credential template may require passing any interaction data such as queries, prompts, context, responses, etc. through a content filter. E.g. a credential attribute applicable to a cross-organizational agent interaction may require a set of filters specified via a unique identifier be applied to data received, transmitted, or both. A cross-organizational credential session 604 may include the applicable content filter identifiers directly as they were determined upon the intersection of session 604 or added by agent 606 subsequently. Content filtering is performed by chaincode 716, which may be triggered by agents 504 and 506 directly, or via an agent-to-agent proxy server. In some embodiments each agent may employ its own proxy server to execute chaincode 716. This is particularly relevant for semi- and autonomous AT agents and providers which may perform complex tasks involving multiple parties, or AT technologies that do not lend themselves to be governed by input rule sets alone.

Content filters may also be required by organization policies for interactions with specific other organizations, e.g. a company may apply one set of content filtering policies with their suppliers, and another set with their customers, independent of the type of interactions with the organization. So, the effective content filter applied in an interaction between any two participants may comprise evaluating the data sent from one entity to another entity against credential attributes of the other entity associated with general policies of the other entity as well as credential attributes associated with interaction-specific requirements.

Content filters may use the type of content to determine whether exchange over a trust boundary is valid. Content types may be in the form of MIME types, sub-types such as video codec identifiers, or based on a combination of basic types, e.g. video+audio+telemetry streams, whereby any combination may have a higher value than any individual basic type due to correlation of the content types.

Content filters may, alternatively or in addition to the above, use metadata associated with the content, such as the author of a document, copyright or proprietary markings, the content age, association with a specific project, or carrying a specific classification or distribution label in the case of government documents.

Content filters may, alternatively or in addition to the above, use patterns in the content itself, e.g. the mentioning of a specific product line, a specific project name, names of involved personnel, locations, and the like. Patterns may be used for filtering in any domain, e.g. the above in textual content, visual features in images and video, auditable features or sequences in audio content, etc. As AI models with other modalities based on a textual representation arise, such as the description of chemical molecules in text, such filter patterns may have other representations than in regular language, such as letter subsequences or other meaningful patters to identify certain types of information.

At step 834, chaincode 702, or some other chaincode operating on another blockchain network, may monitor data exchanged between two entities, either filtered or unfiltered, and generate metrics on the efficiency and "correctness" of users', agents', providers', effectors' behavior in the context of any transaction, the governing credential sessions 602, 604, and/or 606 and/or filter attributes These metrics may be used by issuer 102, IAM service 114, or chaincode on authorization blockchain network 110 to refine the definition of credential attribute types and associated attribute values assigned to an entity with a specific function within an organization either automatically or as part of a human or machine-assisted feedback loop in order to improve future data compliance with an associated credential session and to minimize future filtering. These metrics may further be used to guide the segmentation and scoping of agent and provider skills with respect to their interactions across trust boundaries, or to identify agent skills that may be consolidated, or vice-versa should be distributed into multiple agents. The refinement of credential definitions and values and any guidelines for agent skill scoping may be aided by chaincode analyzing the metrics and identifying key issues such as repeated triggering of content filters in chaincode 716 (i.e. a redaction event), thus implying that the sending agent is either probing or acting maliciously, or not performing as intended by its developer. Tracking a number or rate of filter invocation may be referred to herein as determining a "level" of filtering. Such analysis of these metrics may also be performed directly by network 510, whereby this analysis may yield a notice to technical personnel associated with network 510, whereas other redaction events may trigger automatic revocation of a specific credential or even one or more credential attribute types to prevent further ungoverned data exchanges.

In the description above, certain aspects and embodiments of the invention may be applied independently and some of them may be applied in combination as would be apparent to those of skill in the art. For the purposes of explanation, specific details are set forth in order to provide a thorough understanding of embodiments of the invention.

The above description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure.

The term "user" includes, but is not limited to, a person, a computer, a mobile smart device such as a mobile phone, tablet computer, wearable device, etc., an AI agent, an autonomous robotic platform, or some other non-human entity capable of requesting access to a resource. Similarly, the term "custom user attributes" includes, but is not limited to, attributes and conditions associated with a user, as defined in the preceding paragraph.

The terms "computer-readable medium", "memory", "storage medium", and "information storage device" includes, but is not limited to, portable or non-portable electronic information storage devices, optical storage devices, and various other mediums capable of storing, containing, or carrying instruction(s) and/or data. These terms each may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, RAM, ROM, flash memory, solid state disk drives (SSD), etc. A computer-readable medium or the like may have stored thereon code and/or processor-executable instructions that may represent a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable code", or code symbols to perform the necessary tasks (e.g., a computer-program product) may be stored in a computer-readable or machine-readable medium. A processor(s) may perform the necessary tasks.

What is claimed is:

1. A method performed by a resource access system for providing autonomous AI agent governance, credential management, and secure inter-agent communications, comprising:

generating a root credential session and publishing the root credential session on an authorization blockchain network, the root credential session comprising a first sub-set of credential attributes of the initiating entity applicable to a policy of a first organization;

defining a credential session template, the credential session template comprising a schema comprising a plurality of credential attributes associated with a transaction between any initiating entity and any provider entity;

publishing a first credential session on the authorization blockchain network based on the credential session template, the first credential session identifying a second sub-set of credential attributes that form an intersection between the first sub-set of credential attributes in the root credential session with required credential attributes of the first provider entity required in order to interact with the first provider entity;

evaluating whether the initiating entity's credential values associated with the second sub-set of the credential attributes of the initiating entity satisfy the required credential attributes of the first provider entity for an interaction between the two entities; and processing, by the first provider entity, a prompt received from the initiating entity when the second sub-set of the credential attributes of the initiating entity satisfy the required credential attributes of the first provider entity.

2. The method of claim 1, further comprising:

determining, by the first provider entity, a need to use a second provider entity to perform a sub-task of the task;

publishing a second credential session on the authorization blockchain network based on the credential session template, the second credential session comprising a third sub-set of credential attributes formed by an intersection of the second sub-set of attributes of the initiating entity listed in the first credential session with credential attributes of the second provider entity required in order to interact with the second provider entity;

evaluating whether the third sub-set of the credential attributes of the initiating entity satisfy the required credential attributes of the second provider entity for a second interaction between the first provider entity and the second provider entity; and processing, by the second provider entity, the second interaction when the third sub-set of the credential attributes of the initiating entity satisfy the required credential attributes of the second provider entity.

3. The method of claim 1, wherein generating the root credential session comprises:

retrieving a listing of all credential attributes assigned to the initiating entity by the one or more organizations from the credential blockchain network;

identifying any credential attributes issued to the initiating entity by the first organization; and generating the root credential session listing all credential attributes issued to the initiating entity by the first organization.

4. The method of claim 2, wherein the second credential session further comprises an identification of a filter for filtering information sent between the second provider entity and the first provider entity, the method further comprising:

determining, by either the second provider entity or the first provider entity, whether an interaction between the two entities will cross a trust boundary;

when the interaction will cross a trust boundary:

filtering the information in accordance with the filter; and sending the filtered information to the other provider entity.

5. The method of claim 2, wherein the second credential session further comprises an identification of a filter for filtering information sent between the second provider entity and the first provider entity, the method further comprising:

determining, by the second provider entity or the first provider entity, whether an interaction will cross a trust boundary;

when the interaction will cross a trust boundary:

sending the information to the other provider entity;

filtering the information in accordance with the filter substantially in parallel to sending the information to the other provider entity;

processing the information by the other provider entity;

receiving the filtered information by the other provider entity;

determining, by the other entity, whether the filtered information matches the information; and terminating further processing of the information when the filtered information does not match the information.

6. The method of claim 1, further comprising:

generating a second credential session for future interactions between the first provider entity and a second provider entity and publishing the second credential session on the authorization blockchain network;

generating a third credential session for future interactions between the second provider entity and a third provider entity and publishing the third credential session on the authorization blockchain network;

selecting, by the first provider entity, the second provider entity to process a first sub-task when the second credential session is published on the authorization blockchain network; and selecting, by the first provider entity, the third provider entity to process a second sub-task when the third credential session is published on the authorization blockchain network.

7. The method of claim 1, further comprising:

receiving a second prompt from the first initiating entity;

in response to receiving the second prompt, re-evaluating the second sub-set of the credential attributes of the initiating entity against the required credential attributes of the first provider; and interrupting a second transaction between the initiating entity and the first provider entity when at least one of the second sub-set of credential attributes of the initiating entity no longer satisfies the required credential attributes of the first provider entity.

8. The method of claim 1, further comprising:

monitoring transactions between the initiating entity and the first provider entity in context with each of the transactions and the first credential session;

determining metrics associated with transactions that fail;

refining credential attribute types and associated credential attribute values assigned to the initiating entity or the first provider entity in order to improve future transaction success.

9. The method of claim 4, further comprising:

monitoring data exchanges between the first AI agent and the second AI agent in context with each of the transactions and the first credential session;

determining data in the data exchanges subject to filtering based on the filter and associated metrics describing a level of filtering required for compliance with the first credential session; and refining the credential attribute types and associated credential attribute values assigned to the first AI agent or the second AI agent in order to improve future data compliance with the first credential session and to minimize future filtering.

10. A system for providing autonomous AI agent governance, credential management, and secure inter-agent communications, comprising:

a first AI agent for interacting with a user;

a credential blockchain network for storing a first credential associated with the user and a second credential associated with the AI agent;

an authorization blockchain network for storing a first credential session between the user and the first AI agent, the first credential session defining conditions needed in order for the user to interact with the first AI agent; and chaincode, stored in a distributed fashion on the authorization blockchain network and executed by the authorization blockchain network, that causes the system to:

generate a root credential session and publish the root credential session on the authorization blockchain network, the root credential session comprising a first sub-set of credential attributes listed in the first credential applicable to a first organization;

generate the first credential session based on a credential session template, the credential session template comprising a schema listing a plurality of credential attributes associated with transactions between any two entities in the system, the first credential session formed from an intersection of credential attributes of the first sub-set of credential attributes in the root credential session with credential attributes of the first AI agent stored in the second credential, the first credential session listing common credential attributes between the user and the first AI agent needed in order for the user to interact with the first AI agent;

evaluate whether current credential attributes of the user satisfy at least one of the credential attributes listed in the first credential session; and process, by the first AI agent, a prompt received from the user when at least one of the user's current credential attributes satisfies at least one of the credential attributes listed in the first credential attribute.

11. The system of claim 10, wherein the first AI agent determines a need to use a second AI agent to perform a sub-task; and the chaincode further causes the system to:

generate a second credential session based on the credential session template, the second credential session formed from an intersection of credential attributes of the first credential session with credential attributes of the second AI agent, the second credential session listing common credential attributes between the first credential session and the credential attributes of the second AI agent needed in order for first AI agent to interact with the second AI agent;

evaluate whether current credential attributes of the first AI agent satisfy at least one of the credential attributes listed in the second credential session; and process, by the second AI agent user, a prompt received from the first AI agent when at least one of the first AI agent's current credential attributes satisfies at least one of the credential attributes listed in the second credential attribute.

12. The system of claim 10, wherein the chaincode for generating the root credential session comprises chaincode that causes the system to:

retrieve the first credential from the credential blockchain network;

identify any credential attributes in the first credential associated with a first organization; and generate the root credential session listing all credential attributes issued to the user by the first organization.

13. The system of claim 11, wherein either the second AI agent or the first AI agent determines that an interaction between the two agents will cross a trust boundary; wherein the second credential session further comprises an identification of a filter for filtering information sent between the second AI agent and the first AI agent, the chaincode for further causing the system to:

filter the information in accordance with the filter; and send the filtered information to the other AI agent.

14. The system of claim 11, wherein the second AI agent or the first AI agent determines that an interaction between the two will cross a trust boundary; wherein the second credential session further comprises an identification of a filter for filtering information sent between the second AI agent and the first AI agent, the chaincode for further causing the system to:

send the information to the other AI agent;

filter the information in accordance with the filter substantially in parallel to sending the information to the other AI agent;

process the information by the other AI agent;

receive the filtered information by the other AI agent;

determine, by the other agent, whether the filtered information matches the information; and terminate further processing of the information when the filtered information does not match the information.

15. The system of claim 10, wherein the first AI agent determines a need to use a second AI agent to perform a first and an effector to perform a second sub-task; and the chaincode further causes the system to:

generate a second credential session based on the credential session template, the second credential session formed from an intersection of credential attributes of the first credential session with credential attributes of the second AI agent, the second credential session listing common credential attributes between the first credential session and the credential attributes of the second AI agent needed in order for first AI agent to interact with the second AI agent; and generate a third credential session based on the credential session template, the third credential session formed from an intersection of credential attributes listed in the second credential session with credential attributes of the effector, the third credential session listing common credential attributes between the second credential session and the credential attributes of the effector needed in order for second AI agent to interact with the effector;

wherein the first AI agent selects the second AI agent to process the first sub-task based on the second credential session; and wherein the first AI agent selects the effector to process the second sub-task based on the third credential session.

16. The system of claim 10, wherein the first AI agent receives a second prompt from the user, the second prompt comprising a current state of at least some of the user's credential attributes, the chaincode further causes the system to:

in response to the first AI agent receiving the second prompt, re-evaluate the credential attributes listed in the first credential session against the user's credential attributes in the second prompt; and interrupt a second transaction between the user and the first AI agent when at least one of the user's credential attributes in the second prompt no longer satisfy an associated credential attribute in the first credential session.

17. The system of claim 10, wherein the chaincode further causes the system to:

monitor transactions between the user and the first AI agent in context with each of the transactions and the first credential session;

determine metrics associated with transactions that fail;

refine credential attribute types and associated credential attribute values assigned to the user or the first AI agent in order to improve future transaction success.

18. The system of claim 14, wherein the chaincode further causes the system to:

monitor data exchanges between the first AI agent and the second AI agent in context with each of the transactions and the first credential session;

determine data in the data exchanges subject to filtering based on the filter;

determine metrics describing a level of filtering required for compliance with the first credential session; and refine the credential attribute types and associated credential attribute values assigned to the first AI agent or the second AI agent in order to improve future data compliance with the first credential session and to minimize future filtering.

* * * * *